United States Patent
Patil et al.

(10) Patent No.: US 12,265,457 B2
(45) Date of Patent: Apr. 1, 2025

(54) METHODS AND SYSTEMS FOR DATA RESYNCHRONIZATION IN A REPLICATION ENVIRONMENT

(71) Applicant: Veritas Technologies LLC, Santa Clara, CA (US)

(72) Inventors: Rushikesh Patil, Maharashtra (IN); Sunil Hasbe, Maharashtra (IN)

(73) Assignee: Cohesity Inc., San Jose, CA (US)

( * ) Notice: Subject to any disclaimer, the term of this patent is extended or adjusted under 35 U.S.C. 154(b) by 142 days.

(21) Appl. No.: 18/068,774

(22) Filed: Dec. 20, 2022

(65) Prior Publication Data

US 2023/0123923 A1  Apr. 20, 2023

Related U.S. Application Data

(63) Continuation of application No. 16/805,294, filed on Feb. 28, 2020, now Pat. No. 11,531,604.

(51) Int. Cl.
  G06F 11/20 (2006.01)
  G06F 3/06 (2006.01)
  (Continued)

(52) U.S. Cl.
  CPC ......... *G06F 11/2082* (2013.01); *G06F 3/065* (2013.01); *G06F 9/45558* (2013.01);
  (Continued)

(58) Field of Classification Search
  None
  See application file for complete search history.

(56) References Cited

U.S. PATENT DOCUMENTS

| 5,649,152 A | 7/1997 | Ohran et al. |
| 5,812,793 A * | 9/1998 | Shakib ............... H04L 9/40 |
| | | 709/201 |

(Continued)

FOREIGN PATENT DOCUMENTS

| CN | 109154905 | 1/2019 |
| JP | 2020047107 | 3/2020 |
| WO | 2017014814 | 1/2017 |

OTHER PUBLICATIONS

Alferes et al., "Evolution and Reactivity in the Semantic Web," F. Bry and J. Maluszynski (eds.): Semantic Techniques for the Web: Lecture Notes in Computer Science—5500; Sep. 29, 2009; pp. 161-200.

(Continued)

*Primary Examiner* — Kaushikkumar M Patel
(74) *Attorney, Agent, or Firm* — Campbell Stephenson LLP

(57) ABSTRACT

Methods, computer program products, computer systems, and the like are disclosed that provide for scalable deduplication in an efficient and effective manner. For example, such methods, computer program products, and computer systems can include determining whether a source data store and a replicated data store are unsynchronized and, in response to a determination that the source data store and the replicated data store are unsynchronized, performing a resynchronization operation. The source data stored in the source data store is replicated to replicated data in the replicated data store. The resynchronization operation resynchronizes the source data and the replicated data.

21 Claims, 15 Drawing Sheets

(51) Int. Cl.
  *G06F 9/455* (2018.01)
  *G06F 16/27* (2019.01)
  *G06F 16/907* (2019.01)

(52) U.S. Cl.
  CPC ............ *G06F 16/27* (2019.01); *G06F 16/907* (2019.01); *G06F 2009/45575* (2013.01); *G06F 2201/84* (2013.01)

(56) References Cited

U.S. PATENT DOCUMENTS

| | | | |
|---|---|---|---|
| 5,835,953 A | 11/1998 | Ohran | |
| 5,875,479 A | 2/1999 | Blount et al. | |
| 5,915,098 A | 6/1999 | Palmer et al. | |
| 6,073,222 A | 6/2000 | Ohran | |
| 6,085,298 A | 7/2000 | Ohran | |
| 6,202,085 B1 * | 3/2001 | Benson | G06F 16/2308 709/205 |
| RE37,601 E | 3/2002 | Eastridge et al. | |
| 6,728,898 B2 | 4/2004 | Tremblay et al. | |
| 6,732,245 B2 | 5/2004 | Kaiya et al. | |
| 6,779,093 B1 | 8/2004 | Gupta | |
| 7,039,661 B1 | 5/2006 | Ranade | |
| 7,103,796 B1 | 9/2006 | Kekre et al. | |
| 7,386,752 B1 | 6/2008 | Rakic et al. | |
| 7,987,368 B2 | 7/2011 | Bin | |
| 8,156,074 B1 * | 4/2012 | Multer | G06F 16/178 707/610 |
| 8,577,850 B1 | 11/2013 | Genda et al. | |
| 8,874,508 B1 | 10/2014 | Mittal | |
| 9,087,088 B1 | 7/2015 | Bosse | |
| 9,268,811 B1 | 2/2016 | Thakur | |
| 9,442,806 B1 | 9/2016 | Bardale | |
| 9,509,697 B1 | 11/2016 | Salehpour | |
| 9,575,789 B1 | 2/2017 | Rangari et al. | |
| 9,740,422 B1 | 8/2017 | Ozdemir | |
| 10,496,494 B1 | 12/2019 | Haloi et al. | |
| 10,592,149 B1 | 3/2020 | Jenkins et al. | |
| 10,909,097 B2 | 2/2021 | Bandopadhyay et al. | |
| 11,310,137 B2 | 4/2022 | Bandopadhyay et al. | |
| 11,429,640 B2 | 8/2022 | Patil et al. | |
| 2003/0014433 A1 | 1/2003 | Teloh et al. | |
| 2003/0061366 A1 | 3/2003 | Musantge et al. | |
| 2003/0126388 A1 | 7/2003 | Yamagami | |
| 2003/0158869 A1 | 8/2003 | Micka | |
| 2003/0172316 A1 * | 9/2003 | Tremblay | G06F 11/2082 714/6.23 |
| 2003/0217119 A1 * | 11/2003 | Raman | H04L 67/1097 709/219 |
| 2004/0049365 A1 | 3/2004 | Keller et al. | |
| 2005/0193245 A1 * | 9/2005 | Hayden | G06F 11/2069 714/13 |
| 2007/0185937 A1 | 8/2007 | Prahlad et al. | |
| 2008/0279204 A1 | 11/2008 | Pratt, Jr. | |
| 2009/0187923 A1 | 7/2009 | Mckinney | |
| 2010/0070447 A1 | 3/2010 | Pfunter et al. | |
| 2010/0169720 A1 | 7/2010 | Umpp et al. | |
| 2011/0126099 A1 | 5/2011 | Anderson et al. | |
| 2013/0054523 A1 | 2/2013 | Anglin et al. | |
| 2015/0278395 A1 | 10/2015 | Ben Jemaa et al. | |
| 2015/0280999 A1 | 10/2015 | Chart et al. | |
| 2015/0378839 A1 * | 12/2015 | Langouev | G06F 11/2038 714/19 |
| 2016/0103850 A1 * | 4/2016 | Gupta | G06F 11/1471 707/624 |
| 2016/0306560 A1 | 10/2016 | Maranna et al. | |
| 2016/0371007 A1 | 12/2016 | Shani | |
| 2017/0286690 A1 | 10/2017 | Chari et al. | |
| 2017/0289187 A1 | 10/2017 | Noel | |
| 2017/0300244 A1 | 10/2017 | Crawford et al. | |
| 2018/0109425 A1 | 4/2018 | Chart et al. | |
| 2018/0227205 A1 | 8/2018 | Bandopadhyay et al. | |
| 2018/0285201 A1 | 10/2018 | Bangalore et al. | |
| 2018/0295029 A1 | 10/2018 | Shivaana | |
| 2019/0138995 A1 | 5/2019 | Currin | |
| 2019/0042636 A1 | 7/2019 | Sipka et al. | |
| 2019/0340078 A1 * | 11/2019 | Bangalore | G06F 16/2358 |
| 2020/0097198 A1 | 3/2020 | Bansal et al. | |
| 2021/0026810 A1 | 1/2021 | Gaonkar et al. | |
| 2021/0157777 A1 | 5/2021 | Yang et al. | |
| 2021/0303408 A1 | 9/2021 | Zhang et al. | |

OTHER PUBLICATIONS

Patil et al., "Method and System for Data Consistency Across Failure and Recovery of Infrastructure", U.S. Appl. No. 16/836,288, filed Mar. 31, 2020; consisting of Specification, Claims, Abstract, and Drawings; 29 pages.

Deng et al., "vMerger : Server Consolidation in Virtualized Environment," 2013 IEEE 11th Int'l Conference on Dependable, Autonomic and Secure Computing, pp. 606-612.

Search Report and Written Opinion of International Application No. PCT/US2021/015384, mailed Apr. 13, 2021, 12 pages.

Search Report and Written Opinion of International Application No. PCT/US2021/024850, mailed Aug. 2, 2021, 14 pages.

Communication Pursuant to Article (4(3) EPC—Application No. EP 18707994.2, Sep. 9, 2021, 9 pages.

* cited by examiner

METHODS AND SYSTEMS FOR DATA RESYNCHRONIZATION IN A REPLICATION ENVIRONMENT

CROSS-REFERENCE TO RELATED APPLICATIONS

This application is related to U.S. patent application Ser. No. 16/805,294, entitled "METHODS AND SYSTEMS FOR DATA RESYNCHRONIZATION IN A REPLICATION ENVIRONMENT". The foregoing application is hereby incorporated by reference herein, in its entirety and for all purposes.

FIELD OF THE INVENTION

The present invention relates to deduplication systems and, more particularly, to methods and systems for data resynchronization in a replication environment.

BACKGROUND

An ever-increasing reliance on information and computing systems that produce, process, distribute, and maintain such information in its various forms, continues to put great demands on techniques for providing and maintaining access to such systems and the data processed thereby. Business organizations can produce and retain large amounts of data. While data growth is not new, the pace of data growth has become more rapid, with the location of data more dispersed, and linkages between data sets more complex. The processing resources needed to effectively manage and process such large amounts of data have experienced an accompanying increase. One approach to addressing such needs is the virtualization of such data processing systems, both in terms of data processing and data storage. Also of importance is the ability of such systems to withstand potential disasters, and provide for the fast, efficient restoration of computing services, while protecting users' data.

Such virtualization is becoming increasingly common. One application of virtualization is the simplification of data center management. In such environments, virtual machines can be used to extend the functional capabilities a host computing devices therein provide. How effective the virtual machines are depends, to a large extent, on the configuration of the virtual machines, and the host(s) on which the virtual machines are implemented. Virtual machines are software constructs that can perform tasks typically associated with physical computing devices. Multiple virtual machines can be implemented on a single physical host, each virtual machine having its own operating system, and can operate independently of the other virtual machines. Thus, virtualization systems can allow multiple operating systems (which can actual be separate instances of the same type of operating system) to execute during the same time period on the same hardware. Each executing operating system acts as an independent "virtual machine" and can be interacted with and used in substantially the same manner as standalone operating system executing on independent hardware. Virtual machines allow increased usage of hardware resources by effectively turning one hardware computing device into several virtual machines.

Some virtualization systems provide a virtualization controller that can manage one or more virtual machines implemented on one or more computing devices. Such a virtualization controller can communicate with the virtual machines and control the operation of those virtual machines. In some environments, the virtualization controller can manage the virtual machines in a manner that provides high availability of the virtual machines, such that if a particular virtual machine experiences a failure, the virtualization controller can restart that failed virtual machine on another computing device.

As will be appreciated, today's organizations often rely extensively on data maintained online. Such frequently-accessed, constantly-changing data can be critical to the ongoing operations of such organizations. Unplanned events that inhibit the availability of this data can seriously affect business operations. Additionally, any permanent data loss, from natural disaster or any other source, will likely have serious negative consequences for the continued viability of a business. Therefore, when disaster strikes, organizations must be prepared to eliminate or minimize data loss, and recover quickly with useable data. Data backup can be used to prevent data loss in case of any such disaster. A data backup process typically creates copies of original data. These copies can be used to restore the original data after a data loss event. The backed-up data can be stored using a variety of media, such as magnetic tape, hard drives, and/or optical storage, among others. Various techniques can be used to generate such backups, such full backups, incremental backups, or differential backups, among others. In case of a failure, then, such online data processing systems should provide fast, easy, efficient functionality for recovering from such disasters.

SUMMARY

The present disclosure describes methods, computer program products, computer systems, and the like are disclosed that provide for scalable deduplication in an efficient and effective manner. Such methods, computer program products, and computer systems include determining whether a source data store and a replicated data store are unsynchronized and, in response to a determination that the source data store and the replicated data store are unsynchronized, performing a resynchronization operation. The source data stored in the source data store is replicated to replicated data in the replicated data store. The resynchronization operation resynchronizes the source data and the replicated data.

In one embodiment, the source data and the replicated data have become unsynchronized as a result of a restart condition. Further, in certain embodiments, the determining includes determining whether a data structure indicates that one or more units of data of the source data have not been successfully replicated to the replicated data store, where the data structure is associated with the source data store. Further still, the data structure can be one of an active data structure or a synchronization data structure.

In other embodiments, the determining can include comparing a first restore identifier and a second restore identifier, identifying an identified restore identifier based on a result of the comparing, and sending the identified restore identifier from a sour data mover to a target data mover. In such embodiments, the first restore identifier is a last stored restore identifier associated with a state of the source data, and the second restore identifier is a last replicated restore identifier associated with the state of the replicated data.

In another embodiment, in response to the comparing indicating that the first restore identifier and the second restore identifier agree, the resynchronization operation is performed from a first point in time represented by the first restore identifier, and, in response to the comparing indicating that the first restore identifier and the second restore identifier do not agree, the resynchronization operation is performed from a second point in time represented by the second restore identifier. In such embodiments, the comparing can be performed as part of communications between a write tracker and the source data mover. In such embodiments, the method can further include retrieving retrieved metadata according to the identified restore identifier (where the retrieving is performed by the target data mover), sending the retrieved metadata from the target data mover to the source data mover, and providing the retrieved metadata to the write tracker.

In still other embodiments, such a method can further include generating a merged synchronization data structure by merging the retrieved metadata into a synchronization data structure (where the synchronization data structure is maintained by the write tracker, and the merging is performed by the write tracker), sending the merged synchronization data structure to the target data mover, and, for each element of the merged synchronization data structure, retrieving a unit of the replicated data corresponding to the each element and sending the unit of the replicated data from the target data mover to the source data mover.

In still other embodiments, such a method can further include determining whether verification information for an element of the retrieved metadata indicates that a unit of data corresponding to the element of the retrieved metadata is unchanged and, in response to a determination that the verification information indicates that the unit of data corresponding to the element of the retrieved metadata is unchanged, preventing sending of the unit of data corresponding to the element of the retrieved metadata from the target data mover to the write tracker. In certain embodiments, the source data and the replicated data are unsynchronized as a result of a startup condition.

In certain other embodiments, such a method can further include performing a synchronization operation, upon completion of the synchronization operation, performing a replication operation (where the replication operation replicates a unit of data from the source data store to the target data store, and the unit of data is subject to a write operation), and maintaining an active data structure (where the performing the replication operation and the maintaining the active data structure are performed concurrently).

In certain embodiments, the synchronization operation can include selecting one or more elements of a synchronization data structure (where the synchronization data structure comprises a plurality of elements, and each of the plurality of elements of the synchronization data structure indicate a write operation was performed on a corresponding unit of data of a plurality of units of data stored in the source data store), reading one or more units of data of the plurality of units of data corresponding to the one or more elements of the synchronization data structure, generating metadata corresponding to the one or more units of data, and sending the one or more units of data and the metadata to a data mover.

The foregoing is a summary and thus contains, by necessity, simplifications, generalizations, and omissions of detail; consequently those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE DRAWINGS

Embodiments of methods and systems such as those disclosed herein may be better understood, and its numerous objects, features, and advantages made apparent to those skilled in the art by referencing the accompanying drawings.

Figure 1:
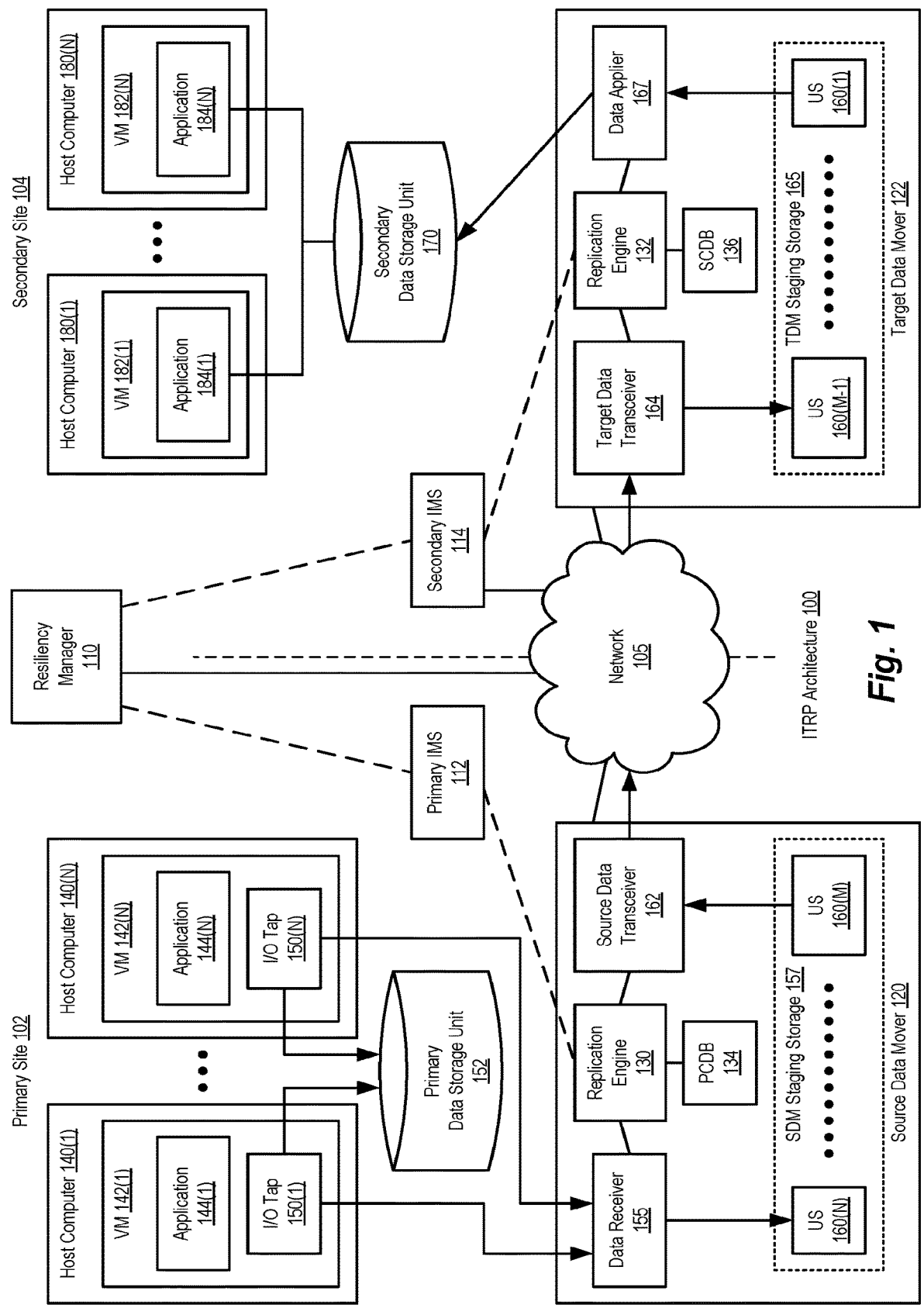
FIG. 1 is a simplified block diagram illustrating an example of components of an information technology resiliency platform architecture, according to one embodiment.

While the present disclosure is susceptible to various modifications and alternative forms, specific embodiments of the present disclosure are provided as examples in the drawings and detailed description. It should be understood that the drawings and detailed description are not intended to limit the present disclosure to the particular form disclosed. Instead, the intention is to cover all modifications, equivalents, and alternatives falling within the spirit and scope of the present disclosure as defined by the appended claims.

DETAILED DESCRIPTION

The following is intended to provide a detailed description and examples of the methods and systems of the disclosure, and should not be taken to be limiting of any inventions described herein. Rather, any number of variations may fall within the scope of the disclosure, and as defined in the claims following the description.

While the methods and systems described herein are susceptible to various modifications and alternative forms, specific embodiments are provided as examples in the drawings and detailed description. It should be understood that the drawings and detailed description are not intended to limit such disclosure to the particular form disclosed.

Instead, the intention is to cover all modifications, equivalents and alternatives falling within the spirit and scope of the appended claims.

Introduction

Methods and systems such as those described herein provide for data resynchronization in a replication environment. Such methods and systems facilitate such resynchronization by implementing mechanisms that facilitate the detection of situations in which the data stored in a data store and replicated data stored in a replicated data store (the latter being produced by replicating the former) are or have become unsynchronized (such that the mechanisms employed to maintain synchronization between the data and the replicated data will not synchronize the replicated data with the data in the normal course of their operation). In providing for the detection of such situations, methods and systems such as those described herein also provide for the resynchronization of such data and replicated data.

Such an architecture avoids a number of problems that would otherwise result from restoration operations performed on physical and/or virtual machines, or their data, by users at a primary site, for example. As will be appreciated, such restoration operations put the computing resource in question back into an earlier state. Lacking mechanisms to detect and identify such operations, the management of such systems on a global scale presents itself as problematic. This is true, for example, when employing an information technology resiliency platform (ITRP; e.g., VERITAS RESILIENCY PLATFORM). An ITRP can address a number of disaster recovery (DR) use cases, allowing users to migrate and recover their organization's digital assets, maintain system functionality and availability in the face of such disasters, and support other such functions. An ITRP such as that described herein can use standalone replication (SR) to move data from one site (e.g., a primary site) to another (e.g., a secondary site), in an ongoing fashion. In so doing, a user's (or organization's) data is typically replicated from such a primary site to the secondary site. However, as will also be appreciated, such a user (or organization) will typically employ some manner of backup software for computing resources (whether physical or virtual) at the primary site, such that the user (or organization) is able to restore a given computing resource and/or data to an earlier point in time. It will be appreciated that users will want and need the ability to perform such restorations (as well as the ability to perform other operations with comparable effects).

Unfortunately, such restorations (as well as other events such as the rebooting of a physical or virtual computing resource) can create inconsistencies for replicated data already persisted at the secondary site. Further, mechanisms to detect the occurrence of events such as restorations, reboots, and other such events are needed, given that, while replication is under the control of components of the ITRP in question, backup software and other such functionality at the primary site will be under the control of the user.

One solution to the problems presented by such situations is to make the computing resources and/or data consistent once again by manually performing the requisite steps needed to perform a full resynchronization, using facilities provided by the ITRP. However, as will be appreciated, such full synchronization involves the transfer of all data and other information regarding the computing resource and/or data from the primary site to the secondary site. Clearly, in terms of computing, network, and storage resources involved, as well as time and human resources, such a full resynchronization is inordinately expensive. Further still, there being numerous approaches to performing such backups and a wide variety of vendor offerings in this regard, detection of backup operations performed thereby is complicated, requiring a specific solution for each. This problem is only compounded by new offerings in the backup software market, and is made worse by the use of multiple such packages at a given primary site. Forcing such vendors to make modifications to their offerings to provide mechanisms for such detection is equally unworkable.

In light of the foregoing, methods and systems such as those described herein provide mechanisms for automatically detecting circumstances giving rise to a lack/loss of synchronization (e.g., actions taken by users, such as restoration, rebooting, or the like), for example, in an ITRP or other replication environment. Further, such methods and systems provide for the synchronization/resynchronization of data and its replicated counterpart in an effective, efficient manner.

As will be described in greater detail subsequently, methods and systems such as those described herein employ the use of write tracking. For example, in one implementation, an input/output (I/O) tracker ("I/O tap") that records information regarding write operations performed by a given computing resource (e.g., a virtual machine) is employed to track write operations in the data modified thereby. Such an I/O tap can be implemented, for example, as a filter driver in the VM in question (also referred to herein as an in-guest filter driver (I/O tap) or as a hypervisor-based filter driver. Such an ITRP architecture also employs one or more data movers at the primary site and one or more data movers at the secondary site. Such data movers, when sending replicated data, are referred to as source data movers. Alternatively, when receiving replicated data, such data movers are referred to as target data movers. In one embodiment, such data movers are implemented as replication appliances deployed on both sites. In such an embodiment, such data movers, as their name implies, move data from one site to the other.

In one embodiment, such filter drivers maintain one or more data structures (e.g., such as bitmaps) to facilitate the synchronization of data and track active I/O operations (e.g., write operations on a per disk basis). In one embodiment, employing bitmaps, such bitmaps are maintained on a separate storage unit (referred to herein as a dirty region logging (DRL)) disk, and so, provides for the tracking of units of data that have been changed by write operations (and so, are considered "dirty" (changed)). A synchronization bitmap is used to synchronize data (as between the primary site and the secondary site) upon startup or initialization, while an active bitmap is used for tracking application writes during normal replication operations. In one embodiment, data at the primary site corresponding dirty/set bits are sent to the primary site's source data mover. The source data mover accumulates changed data and associated metadata over a period of time, and can do so in a file referred to herein as an update set (US). The USs are sent to the target data mover, which in turns unpacks the data sent and writes that unpacked data to the target replication disks. The USs, in one embodiment, include metadata and data. In one embodiment, such metadata includes entries that represent form factors of the data in the US (e.g., such as the location in the update set, the size, and the location in storage of a given amount of data). Such information can include, for example, the logical sector of the replication storage unit at which the given amount of data begins, the physical sector in the US's files at which the given amount of data begins, and amount of data in question. Such metadata can also include verification information (e.g., a checksum, hash, or other such information), in order to maintain data integrity.

In implementing methods and systems such as those described herein, such approaches provide a number of advantages. For example, such approaches are able to detect circumstances leading to data at a primary site and replicated data at a secondary site being or becoming unsynchronized, and can take steps to synchronize/re-synchronize such data. Similarly, such approaches can provide such functionality without regard to the particular backup software employed (i.e., such approaches are vendor-agnostic), backup/restoration techniques employed, or timing of such restoration. Further still, such approaches also address other causes leading to such circumstances (e.g., the rebooting of a VM or host, for example). And in case of failover, such approaches can be used in situations in which a secondary site is active, and the flow of data replication from the secondary site to the primary site.

Thus, methods and systems such as those described herein are thus able to address a variety of circumstances in which a data replication process encounters a situation in which data being replicated and its replicated data counterpart are or become unsynchronized. Such approaches thus automatically detect a loss/lack of synchronization, in a vendor-agnostic manner, and provide for the correction of any resulting data inconsistencies (e.g., subsequent to a restore operation). In addition to the aforementioned advantages, architectures according to embodiments such as those described herein provide a number of other benefits, as will be appreciated from the following description.

Example Architectures Providing Data Resynchronization

Systems such as those described herein provide methods and systems for maintaining data consistency across the failure and recovery of infrastructure, as when performing failover and failback in disaster recovery environments. Such maintaining of data consistency can be achieved, for example, in an environment in which an Information Technology Resiliency Platform (ITRP), according to methods and systems such as those described herein, is implemented. Such an ITRP can provide not only for disaster recovery, but also provide workload management capabilities for virtual machines, as well as various applications, such as those which might be executed on a desktop computer platform. In so doing, such an ITRP architecture provides a system for managing IT applications for numerous resiliency capabilities in various forms, with such solutions providing for, e.g., disaster recovery and workload management. An ITRP architecture according to methods and systems such as those described herein provides a scalable, distributed, and layered architecture with the potential to add new capabilities to the platform on demand. Such an architecture leverages automatic/assisted discovery of IT assets to reduce administrator configuration errors. Further, such an approach can facilitate remote agent capabilities to maintain the IT policies associated with therewith. An ITRP architecture according to methods and systems such as those described herein leverages workflows in a novel manner to provide customization and extensibility to the solution.

An ITRP according to methods and systems such as those described herein also provides for the management of virtual machine (VM) configuration. Such VM configurations are associated both with VMs that are to be provisioned on (and so be hosted on) a node, as well with VMs that are already being hosted by such nodes. A VM configuration can include one or more resource requirements as well as one or more additional requirements. Resource requirements indicate one or more resources that are needed in a node for hosting this VM. Additional requirements indicate one or more operational elements needed in a node for hosting this VM. This VM configuration is compared to configurations of various clusters. The cluster configuration can indicate configuration information for node(s) of that cluster. This comparison can be used to select a cluster that includes nodes that can meet the resource and the additional requirements for hosting this VM. A VM can be provisioned based on a service level agreement (SLA) associated with that VM. An SLA can include various resource requirements such as physical requirements of a node where that VM is provisioned. These resource requirements can include CPU, memory, and other hardware requirements. As a result, the VM is provisioned on a server that has the resources specified by the resource requirements of the SLA associated with that VM.

Methods and systems such as those described herein can be delivered in the form of one or more virtual appliance(s), for example. In certain embodiments, each instance of such a virtual appliance is deployed in three modes:
1. Resiliency Manager (RM) mode only
2. Infrastructure Management Service (IMS) mode Only
3. "RM and IMS" mode (where a combination of these modes is enabled; which can be configured as a default mode, in certain embodiments)

An RM (Resiliency Manager) according to embodiments of systems such as those disclosed herein presents a centralized management functionality, which, in certain embodiments, includes two-layered set of services. In such embodiments, a "bottom"/core layer thereof can be provided that includes services such as a database service, a messaging service, a communication and data fac;ade service, a workflow service, authentication and authorization services, logging and auditing services, and the like, among other such functions and services. Also in such embodiments, a "top"/business layer can be provided that can include, for example, a workload management service, a recovery automation service, a reporting service, and the like, among other such services.

An IMS (Infrastructure Management Service), according to methods and systems such as those described herein, provides a distributed management functionality, which, in certain embodiments, can also include a two-layered set of services. In certain embodiments, the "bottom"/agent layer provides the ability to discover, monitor and operate on supported hardware elements (example—a storage array) and software elements (example—a database (DB) and/or database management system (DBMS) instance(s)). In certain embodiments such as the foregoing, the "top"/aggregator layer provides the ability to provide consolidated summary of discovered assets, uniform operational layer and a persistent state for supported hardware and software elements.

As noted, in an architecture according to methods and systems such as those described herein, backup software can be employed by user at, for example, a primary site to restore data in following ways:
Virtual machine restore.
File restore
Selective disk level restore For example, such backup software can allow a user to restore data to an earlier state, and so to an earlier point in time. In one example, using a value "N" to represent a given point in time, a VM is being replicated to a secondary site for purposes of disaster recovery. Additionally, the VM and its data are protected by backup software, which allows a user to make backup images of the VM (e.g., the VM's state) and/or its data, locally. At this juncture, if the VM/its data is restored, the replication solution employed (e.g., the ITRP) will be unaware of the restoration operation, and so the data in question and its replicated data at the secondary site (in the secondary site's data storage) will be unsynchronized. In such a case, given the replication solution's lack of awareness as to the resulting lack of synchronization (e.g., without approaches such as those described herein, the ITRP has no way of determining the present state of the computing resources being replicated), the replication solution would not take steps to synchronize the data and its replicated data, in the normal course of operations.

However, using methods and systems such as those described herein, such lack of synchronization can be detected (e.g., as by a determination based on information recorded regarding the replication process) and corrected (e.g., as by identifying changes to replicated data at the secondary site needing to be applied to data at the primary site). In order to address such issues, methods and systems according to the present disclosure automatically detect whether an event resulting in and/or leading to a lack of synchronization between, for example, data and replicated data, has occurred.

In general terms, operations such as the following provide an example of a method according to the present disclosure that can be employed to automatically detect and correct data inconsistencies resulting from a lack of synchronization:

a. A unique identifier (e.g., a version, a counter, a universally-unique identifier (UUID), or the like) is sent periodically to a source data mover. This unique identifier is referred to herein as a restore identifier (RID), and can be, for example, an incremental counter. The periodicity of this counter can be based on a given amount of data replicated (e.g., an active replication load), a time interval, or some other appropriate metric.

b. The source data mover sends the RID to its peer data mover (the target data mover) via an inter-site communications channel such as a wide-area network.

c. The target data mover retrieves this RID as part of writing the replicated data to the target replication disk and also persists the RID in its database as well.

d. Metadata corresponding to update sets for a given period of time (e.g., the last N days) is maintained at the secondary site (e.g., in target staging storage of the target data mover, in object store at the secondary site, or other such storage).

e. In the event that a restore operation occurs for a given VM and the VM is booted, its data will be in an earlier state. However, in addition to the data being in an earlier state, bitmaps and RID will have also been restored, and so will also be in their earlier states (e.g., synchronization or active write tracking).

f. As a result of the VM being booted, communications between the filter driver and the source data mover occurs. As part of these communications (referred to herein, e.g., a "handshake"), the source data mover detects that the RID is different (indicating that the filter driver, and so the VM, is in an earlier state). The source data mover also rejects the handshake with the filter driver, in order to move replication into tapping mode only. The same RID will be exchanged with target data mover.

g. The target data mover, in turn, fetches metadata, beginning with the earlier RID, as sent by the source data mover, thereby facilitating identification of data and replicated data from the last RID to the current time (as reflected by the state of the replicated data).

1. The source data mover can then create "restore" bitmap (e.g., on a per disk basis).
  11. Bits in this bitmap are marked (e.g., set or "dirty"), if the corresponding entry in the metadata exists.
    1. In the case in which data has changed, but has subsequently been returned to original state (e.g., write operations that change the information in question in the manner of "A-B-A") can be skipped. This can be accomplished by checking corresponding verification information (e.g., corresponding hash values) across the metadata provided and restored. (Further, database applications as might be used to maintain such information typically perform such operations on data stored thereby.)

h. This "restore" bitmap is then provided to filter driver, which merges this bitmap with the original synchronization bitmap (e.g., as by performing an XOR operation between the bits of this restore bitmap and that of the synchronization bitmap). Once this merge operation has been performed, synchronization using this "new" synchronization bitmap (the merged bitmap) proceeds.

A more detailed description of such methods is now provided in connection with a discussion of the figures.

FIG. 1 is a simplified block diagram illustrating an example of components of an information technology resiliency platform architecture, according to one embodiment. FIG. 1 thus illustrates an ITRP architecture 100. ITRP architecture 100, as an example of possible components of an ITRP and the relationships therebetween, includes various computing resources at a primary site 102 and a secondary site 104, which are in communication via a network 105. As noted earlier, an ITRP such as that depicted as ITRP architecture 100 provides a resiliency manager 110 that orchestrates the ITRP by communicating with various infrastructure management services (depicted in FIG. 1 as a primary IMS 112 and a secondary IMS 114), which, in turn, communicate with the replication engines of the data movers depicted therein. More specifically, primary IMS 112 communicates with the components of a source data mover 120, while secondary IMS 114 communicates with the components of a target data mover 122.

More specifically still, primary IMS 112 communicates with a replication engine 130 of source data mover 120, while secondary IMS 114 communicates with a replication engine 132 of target data mover 122.

Source data mover 120 provides replication services to the computing resources of primary site 102, replicating data at primary site 1022 secondary site 104 by replicating the data resulting from write operations to secondary site 104 by way of communications with target data mover 122 via network 105. In addition to replication engine 130, source data mover 120 provides a primary configuration database 134, while target data mover 122 maintains replication configuration information in a secondary configuration database 136.

In operation, ITRP architecture 100 provides a number of host computers (depicted in FIG. 1 as host computers 140(1)-(N), and referred to in the aggregate as host computers 140), each of which support one or more virtual machines (depicted in FIG. 1 as virtual machines 142(1)-(N), and referred to in the aggregate as virtual machines 142), which, in turn, each support one or more applications (depicted in FIG. 1 as applications 144(1)-(N), and referred to in the aggregate as applications 144). Also depicted in FIG. 1 are a number of filter drivers (depicted in FIG. 1 as I/O taps 150(1)-(N), and referred to in the aggregate as I/O taps 150). In the manner noted elsewhere herein, I/O taps 150 track information regarding write operations to a primary data storage unit 152, and also passes such information (e.g., metadata) to a data receiver 155 of source data mover 120. In turn, data receiver 155 passes this data and metadata to source data mover (SDM) staging storage 157 as update sets (depicted in FIG. 1 as update sets (USs) 160(N)-(M)), under the control of replication engine 130. Conversely, also under the control of replication engine 130, a source data transceiver 162 sends such update sets from source data mover 122 target data mover 122 via network 105. These update sets are received at target data mover 122 by a target data receiver 164 target data receiver 164 then stores the update sets received (depicted in FIG. 1 as update sets (USs) 160(M-1)-(1)) in target data mover (TDM) staging storage 165. In turn, a data applier 167 retrieves update sets from TDM staging storage 165 and applies those update sets to a secondary data storage unit 170.

Also depicted in FIG. 1 are a number of host computers (depicted in FIG. 1 as host computers 180(1)-(N), and referred to in the aggregate as host computers 180), which support a number of virtual machines (depicted in FIG. 1 as virtual machines 182(1)-(N), and referred to in the aggregate as virtual machines 182). Virtual machines 182, in turn, support one or more applications (depicted in FIG. 1 as applications 184(1)-(N), and referred to in the aggregate as applications 184). Host computers 180, virtual machines 182, and applications 184 are depicted to illustrate a scenario in which one or more virtual machines have been failed over to secondary site 104, as might be the case, for example, were a disaster to befall the infrastructure at primary site 102.

It will be noted that the variable identifiers such as those used herein (e.g., "N" and "M") are used to more simply designate the final element of a series of related or similar elements, or identify intermediate ones thereof. The repeated use of such variable identifiers is not meant to imply a correlation between the sizes of such series of elements, although such correlation may exist. The use of such variable identifiers does not require that each series of elements has the same number of elements as another series delimited by the same variable identifier. Rather, in each instance of use, the variable identified may hold the same or a different value than other instances of the same variable identifier.

It will also be appreciated that each of the foregoing components of ITRP architecture 100, as well as alternatives and modifications thereto, are discussed in further detail below and/or will be apparent in view of this disclosure. In this regard, it will be appreciated that the various data storage systems described herein can be implemented by any type of computer-readable storage medium, including, but not limited to, internal or external hard disk drives (HDD), optical drives (e.g., CD-R, CD-RW, DVD-R, DVD-RW, and the like), flash memory drives (e.g., USB memory sticks and the like), tape drives, removable storage in a robot or standalone drive, and the like. Alternatively, it will also be appreciated that, in light of the present disclosure, ITRP architecture 100 and/or the various networks thereof can include other components such as routers, firewalls and the like that are not germane to the discussion of the present disclosure and will not be discussed further herein. It will also be appreciated that other configurations are possible.

Figure 2:
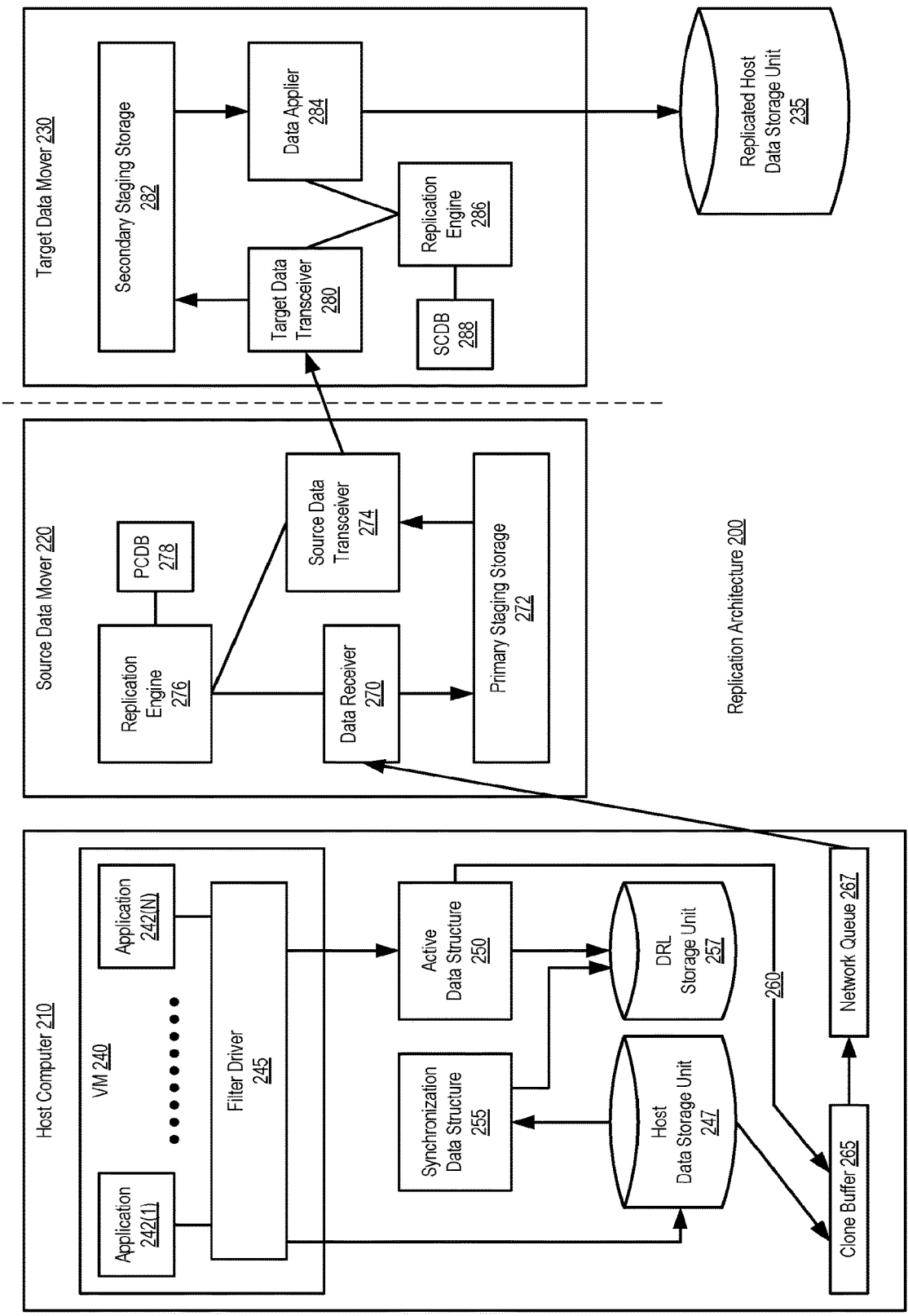
FIG. 2 is a simplified block diagram illustrating an example of certain components, features, and processes of a replication architecture, according to one embodiment.

FIG. 2 is a simplified block diagram illustrating an example of certain components, features, and processes of a replication architecture, according to one embodiment. FIG. 2 thus illustrates a replication architecture 200, which depicts certain of the features of ITRP architecture 100 in greater detail. To this end, FIG. 2 depicts a host computer 210 (e.g., in the manner of one of host computers 140 of FIG. 1) communicatively coupled to a source data mover 220 (e.g., in the manner of source data mover 120 of FIG. 1), which is, in turn, communicatively coupled to a target data mover 230 (e.g., in the manner of target data mover 122 of FIG. 1). Target data mover 230 stores replicated data in a replicated data store such as a replicated host data storage unit 235 (e.g., in the manner of secondary data storage unit 170 of FIG. 1).

Also in the manner of host computers 140 of FIG. 1, host computer 210 supports a virtual machine 240 that, in turn, supports a number of applications (depicted in FIG. 2 as applications 242(1)-(N), and referred to in the aggregate as applications 242, in the manner of applications 144 of FIG. 1) and a filter driver 245 (in the manner of I/O taps 150 of FIG. 1). Filter driver 245 captures information regarding write operations performed by applications 242, and, while shown as being implemented as an in-guest filter driver (I/O tap), can be implemented as a hypervisor-based filter driver to equally advantageous effect. The data of such write operations is written to a host data storage unit 247. Information regarding such write operations are also reflected in an active data structure 250. Active data structure 250 is maintained as part of replication operations performed with respect to the data written by applications 242 two host data storage unit 247 during normal replication operations. Also maintained by filter driver 245 is a synchronization data structure 255. Synchronization data structure 255 is employed in synchronization and resynchronization operations (e.g., as between data stored in host data storage unit 247 and replicated host data storage unit 235, as well as the converse according to methods and systems such as those described herein). As is illustrated, active data structure 250 and synchronization data structure 255 are persisted in a DRL storage unit 257. A DRL ("dirty region log") is a storage construct that stores information indicating whether a region of data has been changed (i.e., is "dirty") at some point in time.

Data written to host data storage unit 247 and corresponding metadata (including store identifiers and information from active data structure 250, which appear as part of metadata 260) is written to a clone buffer 265. As will be appreciated in light of the present disclosure, data stored to host data storage unit 247 can be written there to and subsequently copied to clone buffer 265, or, in the alternative, written to both host data storage unit 247 and clone buffer 265 substantially simultaneously, as part of the same write operation. Further, it will be appreciated that data stored in a data store in host data storage unit 247 can include all manner of information, including configuration information, one or more files (as might, for example, be stored in a file system), some number of chunks/segments/blocks of data, or other such units of data, which may be quantified in terms of bytes of data, one or more storage disks, one or more storage volumes, or the like. Further, such storage architectures may also be referred to as data storage systems, of which the host data storage unit and the replicated host data storage unit are examples. Data and metadata stored in clone buffer 265 is then transferred to a network queue 267, for forwarding to source data mover 220.

This data and metadata is received by source data mover 220 at a data receiver 270, which stages the data and metadata as update sets in a primary staging storage 272 as update sets. A source data transceiver 274 retrieves these update sets and sends them to target data mover 230. Data receiver 270 and source data transceiver 274 perform these operations under the control of a replication engine 276 that is configured using information in a primary configuration database 278.

The update sets sent by source data mover 220 are received by target data mover 230 at a target data transceiver 280. Target data transceiver 280 stages the update sets thus received in a secondary staging storage 282. A data applier 284 then retrieves these update sets from secondary staging storage 282, and applies the retrieved update sets to replicated host data storage unit 235. Target data transceiver 280 and data applier 284 perform the foregoing operations under the control of a replication engine 286 that is configured using information in a primary configuration database 288.

Figure 3:
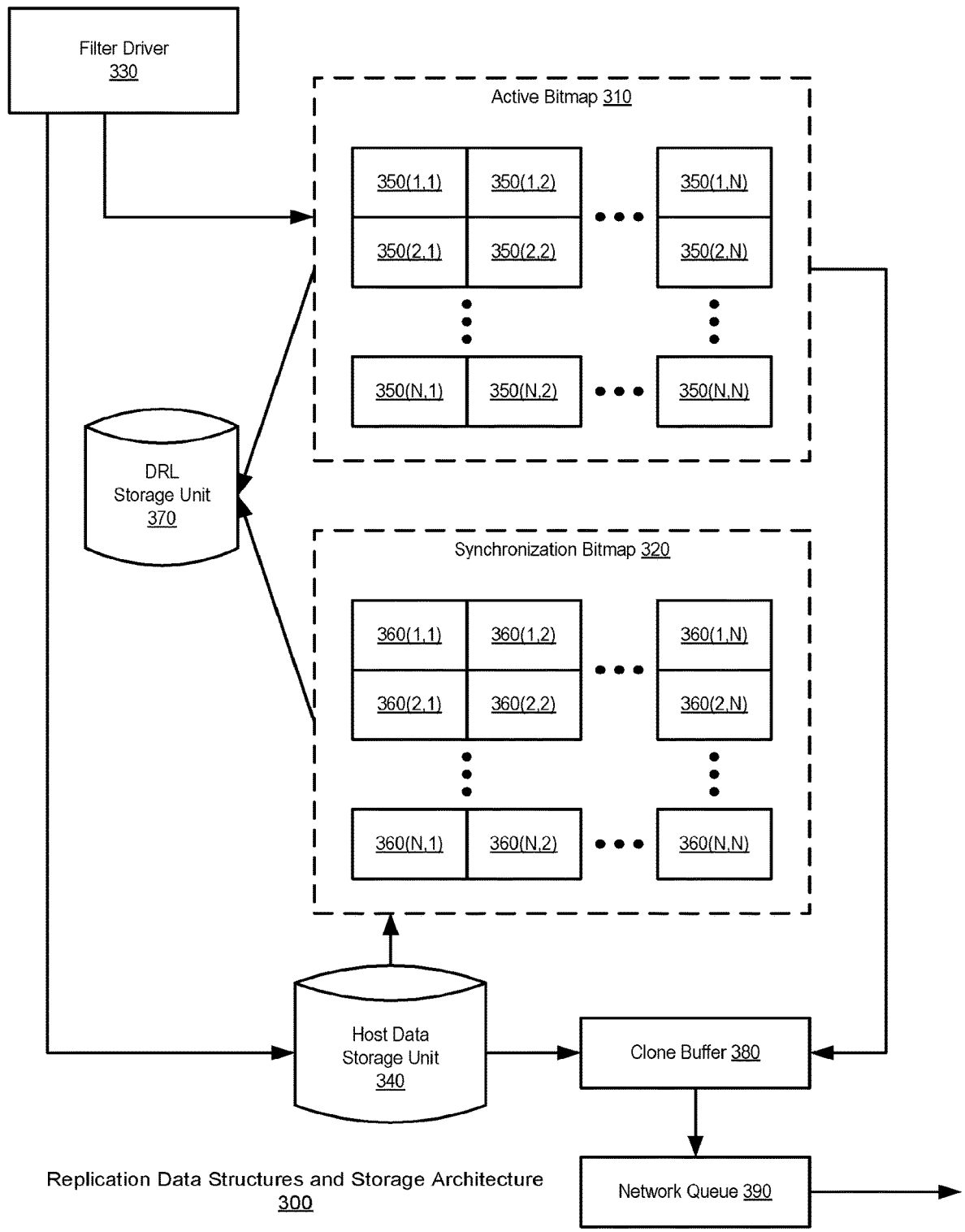
FIG. 3 is a simplified block diagram illustrating an example of certain components of replication data structures and storage, according to one embodiment.

FIG. 3 is a simplified block diagram illustrating an example of certain components of replication data structures and storage, according to one embodiment. FIG. 3 illustrates an implementation of the active and synchronization data structures described earlier. A replication data structures and storage architecture 300 is thus depicted, in which active data structure is implemented as an active bitmap 310, and the synchronization data structure is implemented as a synchronization bitmap 320. As before, a filter driver 330 captures information regarding write operations issued by one or more applications executed by one or more virtual or physical machines. The data of such right operations are passed (e.g., by filter driver 330, or directly from the application(s) in question) to a host data storage unit 340.

Filter driver 310 also stores information regarding the size and location of the data written by such write operations in active bitmap 310, indicating which units of data (regions) had changed ("dirtied"). Such information can be maintained, for example, in a number of bits (depicted in FIG. 3 bits 350(1)-(N), and referred to in the aggregate as bits 350). As is discussed elsewhere herein, bits 350 reflect data changed by write operations during, for example, replication operations.

Similarly, synchronization bitmap 320 maintains information regarding the size and location of data that differs as between source replication storage and target replication storage. Such differences can result from, for example, a virtual machine being initialized for the first time, but can also result from inconsistencies caused by the restoration and/or restart of machines occurring during replication operations. In a fashion similar to active bitmap 310, synchronization bitmap 320 maintains information regarding such discrepancies, for example, in a number of bits thereof (depicted in FIG. 3 bits 360(1)-(N), and referred to in the aggregate as bits 360).

As is depicted in FIG. 3, bits 360 of synchronization bitmap 320 are used during synchronization to identify the units of data in one or more data stores stored in host data storage unit 340 that need to be transmitted to the target system's storage systems (e.g., on a secondary site). Thus, bits 360 of synchronization bitmap 320 identify those units of data (stored in the source data store) that are to be copied during synchronization of a target system's storage systems (target data store) with those of a source storage system, as when a given machine is initialized, or such systems are recovering from a failure or other service interruption.

As before, information in active bitmap 310 and synchronization bitmap 320 is persisted in a DRL storage unit 370. Also as before, in performing replication operation such as those described elsewhere herein, changed data stored in host data storage unit 340 and metadata (e.g., information from active bitmap 310, as well as, possibly, restore identifiers, and other such information) are copied to a clone buffer 380. Data and metadata stored in clone buffer 380 can then be queued for transmission to the source data mover in a network queue 390.

Figure 4:
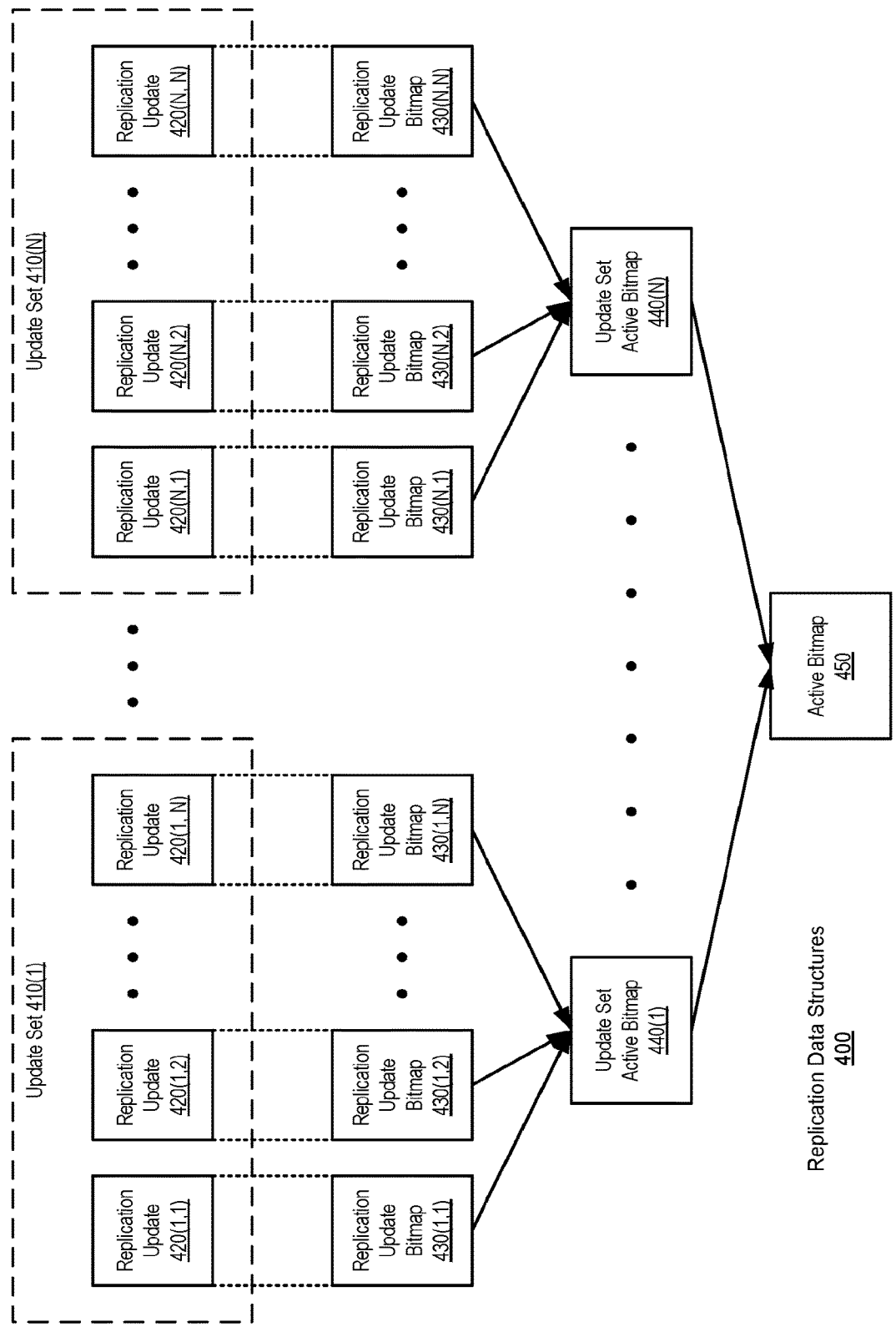
FIG. 4 is a simplified block diagram illustrating an example of certain components of replication data structures and their maintenance, according to one embodiment.

FIG. 4 is a simplified block diagram illustrating an example of certain components of replication data structures and their maintenance, according to one embodiment. FIG. 4 thus illustrates a number of replication data structures 400. Replication data structures 400 can, for example, include a number of update sets (depicted in FIG. 3 as update sets 410(1)-(N), and referred to in the aggregate as update sets 410). In turn, each of update sets 410 includes one or more replication updates (depicted in FIG. 3 as replication updates 420(1, 1)-(N,N), and referred to in the aggregate as replication updates 420). In the embodiment depicted in FIG. 4, corresponding to each of replication updates 420 are replication update bitmaps (depicted in FIG. 3 as replication update bitmaps 430(1, 1)-(N,N), and referred to in the aggregate as replication update bitmaps 430). In this embodiment, replication update bitmaps 430 include information that represents the location and size of the changes in the source data replicated in replication updates 420. Replication update bitmaps 430 can be combined to form bitmaps for each update set (depicted in FIG. 3 as update set bitmaps 440(1)-(N), and referred to in the aggregate as update set bitmaps 440). In replication data structures 400, such an operation combines replication update bitmaps 430(1, 1)-(1, N) to form update set bitmap 440(1), for example. As will be appreciated in light of present disclosure, an update set bitmap such as update set bitmap 440(1) can serve as the active bitmap, though in replication data structures 400, update set bitmaps 440(1)-(N) or combined to form an active bitmap 450. As also will be appreciated in light of present disclosure, a determination as to the persistence of the changes represented by such bitmaps in the intended target system's target data store is dependent, in certain embodiments, on the frequency of the movement of such data and its acknowledgment by the target system. That being the case, such active bitmaps represent data that has been changed at the source system, but has not yet been persisted at the target system. As will also be appreciated, such persistence involves the clearing of the active bitmap (indicating the persistence of the changes at the target system), upon receipt of an indication that such persistence was successful. Further, it will therefor be appreciated that, in replication data structures 400, update set active bitmaps 440 reflect the state of the corresponding one of update sets 410, while active bitmap 450 is cumulative in nature (given that update sets 410 are received over a period of time).

Example Processes for Data Resynchronization

Figure 5:
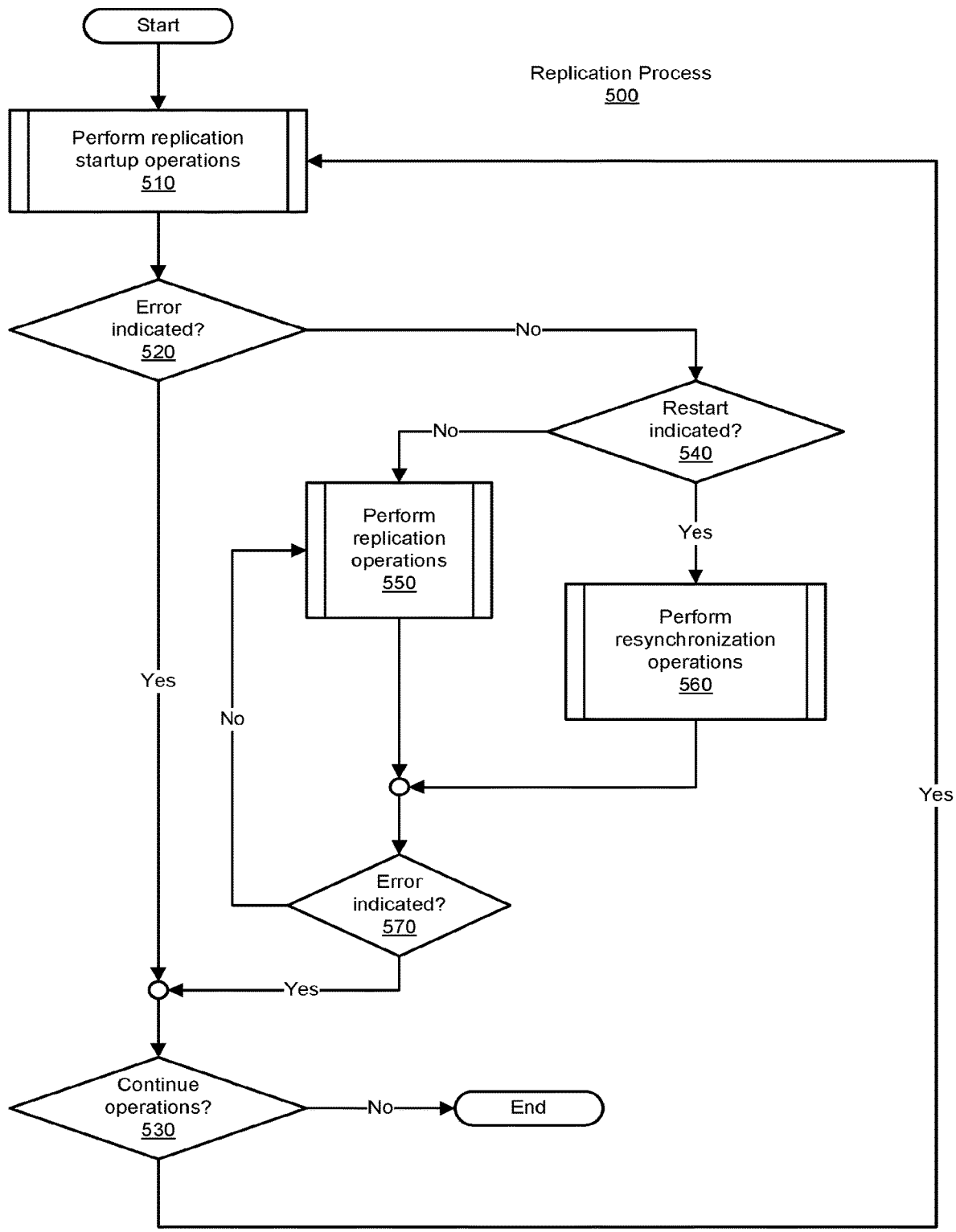
FIG. 5 is a flow diagram illustrating an example of a replication process, according to one embodiment.

FIG. 5 is a flow diagram illustrating an example of a replication process, according to one embodiment. FIG. 5 thus illustrates a replication process 500. Replication process 500 begins with the initialization of a protected machine (e.g., a protected host machine or a virtual machine executed by a protected host machine). Using a virtual machine is an example, replication process 500 begins with replication startup operations being performed (510). An example of the operations that might be performed in replication startup is described in connection with FIG. 6, subsequently. A determination is then made as to whether an error condition occurred during the replication startup operations (520). If one or more errors are indicated, a determination is made as to whether replication operations should be continued (530). If replication operations are to cease, replication process 500 includes. Alternatively, if replication operations are to continue, replication process 500 loops to performing the aforementioned replication startup operations again in an attempt to address the problems encountered (510).

Alternatively, in the case in which the replication sort of operations do not encounter an error or the error is successfully addressed (520), replication process 500 proceeds to making a determination as to whether a restart event has occurred or normal replication operations should commence (540). As will be described further subsequently, the analysis involved in making such a determination can be based on the state of various data structures (e.g., an active data structure and/or a synchronization data structure, such as those described elsewhere herein) and/or a determination as to the current state of replication as between one or more source data stores and one or more target data stores. Such current states can be represented, for example, through the use of restore identifiers or the like, which can be generated periodically (e.g., based on metrics such as a period of time, and amount of data, or the like).

In embodiments such as those described elsewhere herein, a restart event can be detected, for example, by checking the appropriate active bitmap and/or synchronization bitmap. If one or more bitmaps (such as can be used to track write operations, replication, and/or synchronization) indicate one or more right operations need to be replicated or target data requires synchronization with source data (e.g., an active bitmap and/or synchronization bitmap reflect one or more "dirty" units of data), some manner of restart operation (e.g., a reboot, a restoration to an earlier point in time, or the like) can be assumed to have occurred.

In the case in which normal replication operations are to commence, replication process 500 proceeds with performing such replication operations (550). An example of the operations that might be performed as part of such replication operations is described in connection with FIGS. 8A and 8B, subsequently. Alternatively, in the case in which a restart operation has been determined to have occurred, resynchronization operations are commenced (560). An example of the operations that might be performed as part of such resynchronization operations is described in connection with FIG. 9, subsequently. Once the requisite resynchronization operations have been performed, replication process 500 proceeds to a determination as to whether an error has been indicated as a result thereof (570). In the case of an error, replication process 500 proceeds to a determination as to whether replication operations should be continued (530), and then proceeds to concluding or performing replication startup operations, as appropriate. If no error is encountered (570), replication process 500 proceeds to performing replication operations in the normal course (550). If, while performing such replication operations (550), an error is encountered, replication process 500 proceeds to such a determination (570), and proceeds appropriately therefrom.

In the flow diagram of FIG. 5, as well as other flow diagrams presented herein, each block represents one or more operations that can be implemented in hardware, software, or a combination thereof. In the context of software, the blocks represent computer-executable instructions that, when executed by one or more processors, cause the processors to perform the stated operations. Generally, such computer-executable instructions can include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes performed as part of the flow diagrams presented herein, as well as discussions of the operations of the block diagrams presented herein, are described with reference to their respective figures, although other models, frameworks, systems and environments may be used to implement these processes.

Figure 6:
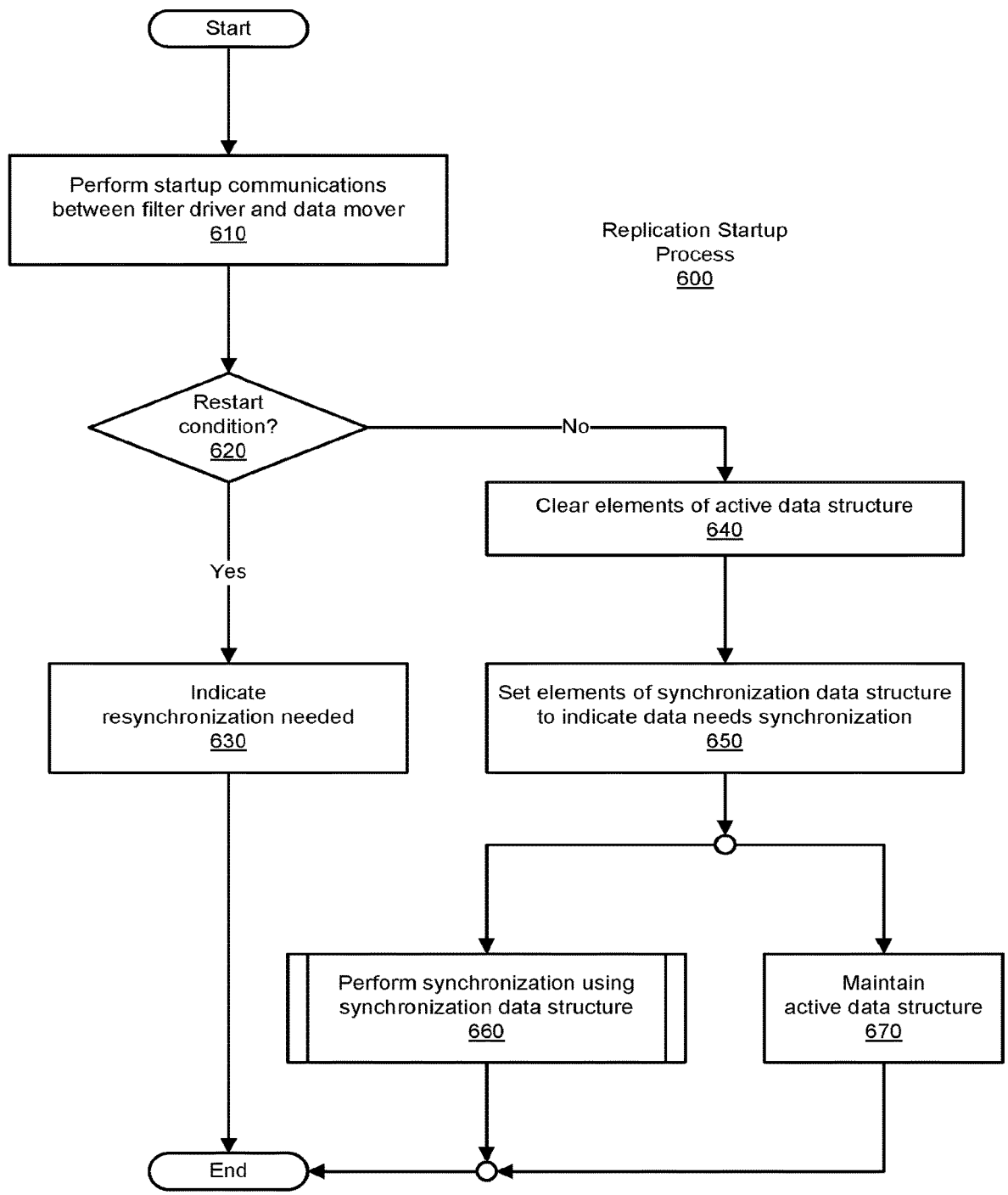
FIG. 6 is a flow diagram illustrating an example of a replication startup process, according to one embodiment.

FIG. 6 is a flow diagram illustrating an example of a replication startup process, according to one embodiment. FIG. 6 thus illustrates a replication startup process 600, such as that described in connection with FIG. 5, previously. Replication startup process 600 begins with startup communications between the given filter driver and its associated data mover (610). In conducting such communications, the filter driver can make a determination as to whether a restart event is indicated by the present conditions (620). As before, such a determination can be based on, for example, information remaining in one or more of the data structures involved, thereby indicating that some amount of target data is no longer in synchronization (consistent) with the corresponding source data. If such is the case, it can be assumed that a startup event such as a restoration or reboot has occurred. If a restart event is determined to have occurred, replication startup process 600 proceeds to indicating that a resynchronization is needed (630). Replication startup process 600 then concludes.

Alternatively, if a restart condition is not detected, replication startup process 600 proceeds with clearing the elements of the active data structure in question (640). Typically, however, such clearing will not be needed in such a case, given that (in view of the fact that a restart event would not have occurred along this path of execution) the active data structure would not be expected to reflect any write operations. The elements of the appropriate synchronization data structure, however will be set in a manner that indicates that the source data (which will have not been replicated at this juncture) will need to be synchronized (and so copied to the target system's target data store (a full synchronization)) (650).

At this juncture, the aforementioned synchronization is performed using the synchronization data structure in question (660). An example of synchronization operations is described in connection with FIG. 7, subsequently. Substantially simultaneously, in order to capture and replicate write operations that occur during the aforementioned synchronization, the active data structure in question is maintained (670). Replication startup process 600 then concludes. As will be appreciated in light of the present disclosure, however, once the target data store is synchronized with the source data store, the synchronization data structure will ultimately be cleared, and the active data structure will be maintained as normal replication operations proceed. In this regard, completion of synchronization can be done by determining if any elements in synchronization data structure remain in a state that indicates that more data remains to be synchronized (e.g., as by making a determination with respect to whether one or more bits of a synchronization bitmap remain set)

Figure 7:
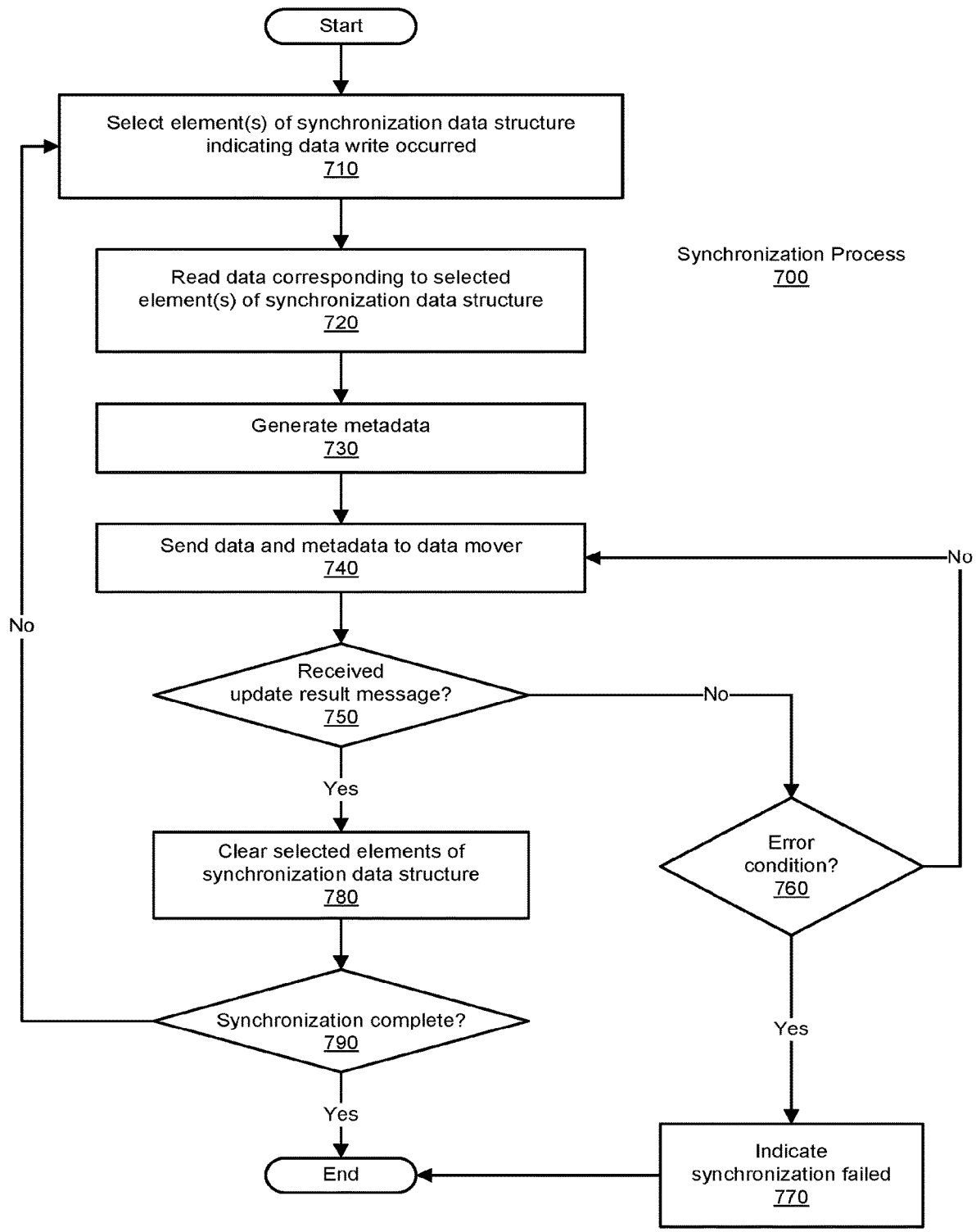
FIG. 7 is a flow diagram illustrating an example of a synchronization process, according to one embodiment.

FIG. 7 is a flow diagram illustrating an example of a synchronization process, according to one embodiment. FIG. 7 thus illustrates a synchronization process 700, in the manner of that described earlier in connection with FIG. 6. Synchronization process 700 begins by selecting one or more elements of the synchronization data structure in question that indicate a write operation has occurred (710). In the examples described herein with regard to the use of bitmaps such indication can be made by setting (e.g., to a binary value of "1") the one or more bits representing the data subject to such a write operation, with regard to their location and extent (with, conversely, bits set to a binary value of "0" representing unchanged data). The units of data corresponding to such selected elements of the synchronization data structure are then read (720). At this juncture, metadata for the source data read is generated (730). Such metadata can include information describing a location of the source data in question, as well as such source data's size.

The data and metadata thus generated are then sent to the source system's data mover (740). A determination is then made as to whether the data and metadata (update result message) was successfully received by the data mover (750). If no such indication is forthcoming, a determination is made as to whether an error has occurred (760). If no air-conditioners occurred, synchronization process 700 resends the data and metadata to the data mover (740). Alternatively, if an error condition has prevented the proper receipt and processing (and so acknowledgment) of the update result message, and indication as to the synchronization having failed is provided (770). Synchronization process 700 then concludes.

In the alternative, if the update result message (including the data and metadata) is successfully received (750), the selected elements of the synchronization data structure are cleared (780), indicating that synchronization of the data in question can be treated as having been successfully accomplished. Next, a determination as to whether synchronization process 700 has completed is made (790). If further data remains to be synchronized, synchronization process 700 loops to the selection of the next element(s) of the synchronization data structure, and synchronization of the target data store with the source data store for those units of data that is indicated proceeds (710). Alternatively, if synchronization process 700 is complete, synchronization process 700 concludes.

Figure 8A:
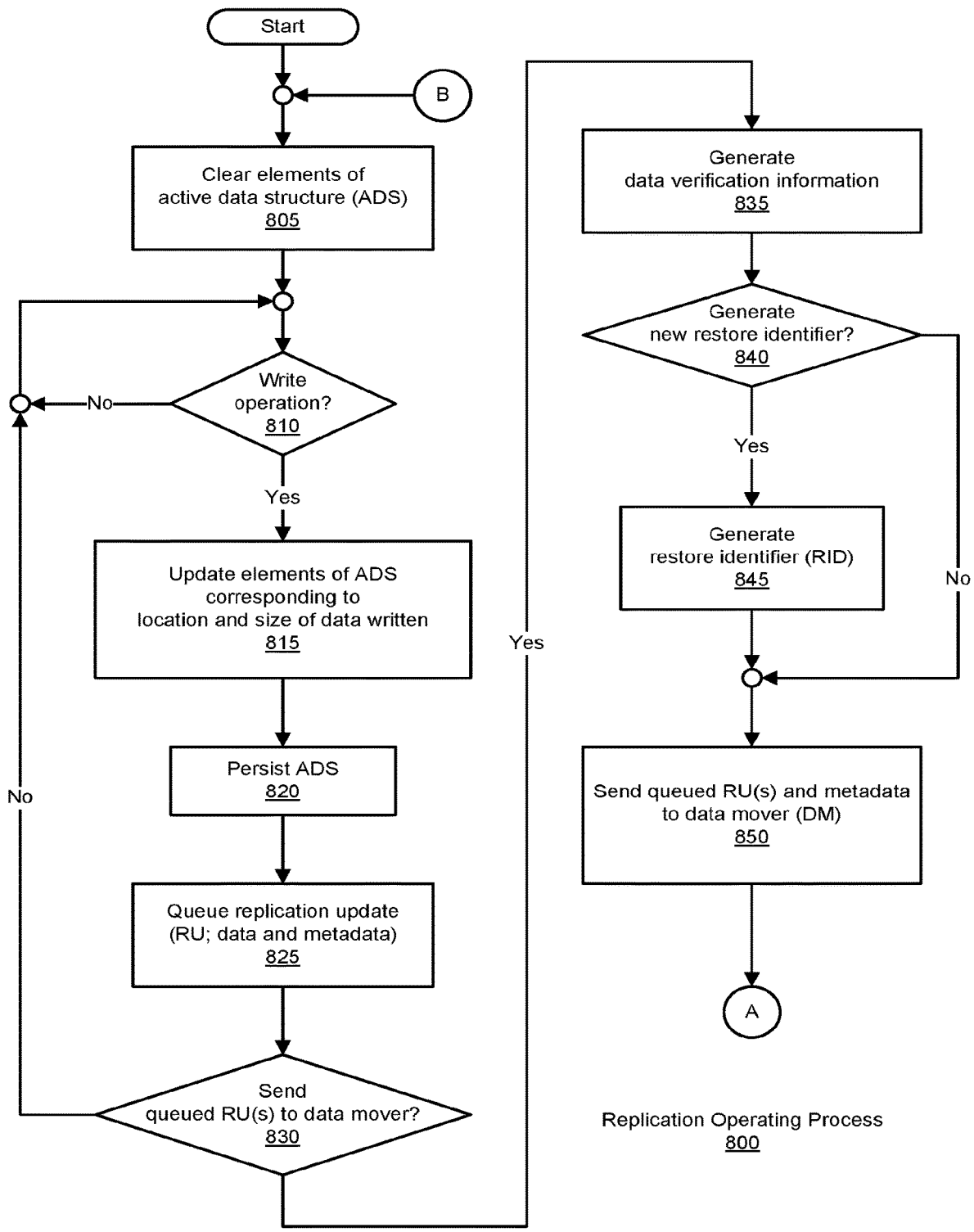
FIGS. 8A and 8B are flow diagrams illustrating an example of a replication operating process, according to one embodiment.
Figure 8B:
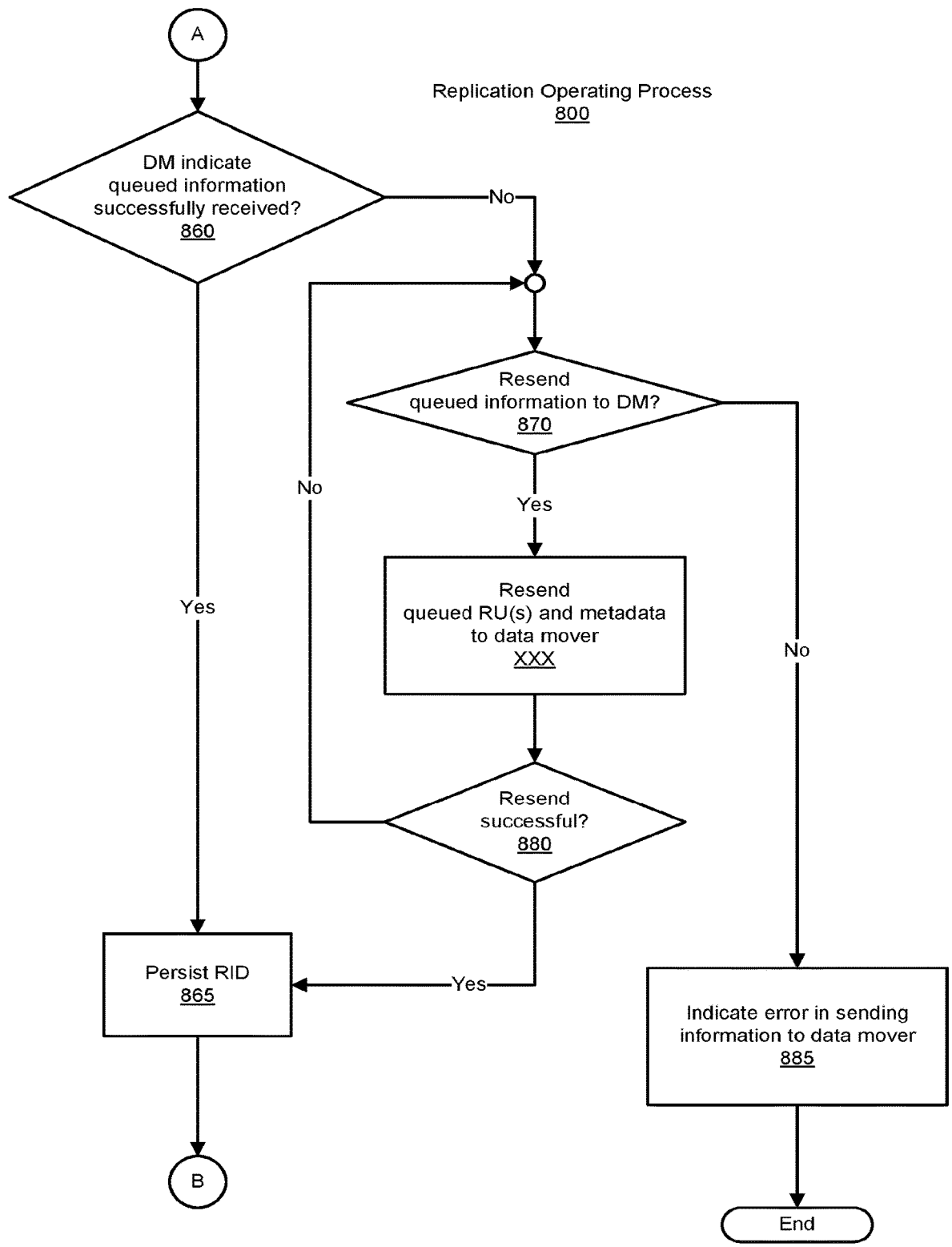

FIGS. 8A and 8B are flow diagrams illustrating an example of a replication operating process, according to one embodiment. FIGS. 8A and 8B thus illustrate a replication operating process 800. Replication operating process 800, as depicted in FIG. 8A, begins with the elements of the active data structure being cleared (805). As noted earlier, such clearing is typically unnecessary, but from a practical perspective, can be done to ensure an indication that the target data store in question is synchronized with the source data store. Next, replication operating process 800 (and more particularly, the filter driver in question) awaits receipt of a write operation (810). Replication operating process 800 loops until such time as a write operation occurs. Upon receipt of a write operation, one or more elements of the active data structure, corresponding to the location and size of the data written, are updated (815). The present state of the active data structure can then be persisted (e.g., to the source system's DRL storage unit) (820). The replication update thus generated (including the relevant data and metadata) is then queued for transmission to the source data mover by way of, for example, a clone buffer and network queue (825). In certain embodiments, such metadata will include information regarding data that is the subject of the replication update such as a logical block number (LBN), the size of the region of data (e.g., the number of units of data), and a physical block number (PBN). In such an embodiment, when replicating a virtual machine, the logical block number can represent an offset from the beginning of a virtual machine disk (VMDK), while the physical block number can represent a physical location of the data in question in physical storage (e.g., the location of the data in the host data storage unit, and nominally, in the replicated host data storage unit).

Once the replication update in question has been queued, a determination is made as to whether that in any other replication updates in the network queue aridity be sent to the source data mover (830). If additional replication updates are to be queued prior to such transmission (830), replication operating process 800 loops to awaiting the next write operation (810).

Alternatively, if the requisite number of replication updates have been queued (or the defined period of time has elapsed, or other threshold reached), data verification information can be generated (835). Such data verification information can include, for example, a checksum for the data of each replication update. As will be described subsequently, such a checksum (and, optionally, other data verification information, such as that described elsewhere herein) can be included in update sets sent from the source system to the target system and subsequently used in making a determination as to whether data in the target data store has ultimately remain unchanged.

A determination is also made as to whether a new restore identifier (RID) is to be generated (840). Such a restore identifier, generated and sent to the target system periodically (based, e.g., on a period of time lapsing, a certain amount of data having been replicated, or other such metrics), allows an ITRP such as that described herein to determine a point from which synchronization should occur, thereby avoiding the need for a full synchronization (e.g., in case of a machine being restored, rebooted, or other such event). If a new restore identifier is to be generated, the filter driver in question proceeds with its generation (845).

Once the new restore identifier has been generated (if such is the case), the queued replication updates and associated metadata (including the aforementioned LBN, size, PBN, data verification information, restore identifier (if generated), and other related information) is sent to the source data mover (850). Replication operating process 800 then continues to FIG. 8B by way of connector "A".

Replication operating process 800 thus proceeds to a determination as to whether the queued information sent to the data mover has been successfully received (860). If the queued information (replication updates and associated metadata) have been successfully received by the source data mover, the restoration identifier is persisted in the source system's DRL storage unit (865). In that case, replication operating process 800 then proceeds to FIG. 8A by way of connector "B", at which point (the replication updates and metadata having been successfully received) the active data structure is cleared (805) and the next write operation awaited (810).

Alternatively, if the source data mover fails indicate that the queued information was successfully received (860), replication operating process 800 proceeds to a determination as to whether the queued information should be resent to the source data mover (870). If it is determined that the queued information should be resent to the source data mover, the filter driver initiates the resending of the queued information to the source data mover (875). In that case, a determination is then made as to whether the retransmission of the queued information was successful (880). In the case in which the queued information was retransmitted successfully, the restore identifier is persisted, as before (865), and replication operating process 800 returns to clearing the elements of the active data structure and awaiting the next write operation, as before, via connector "B".

If retransmission of the queued information cannot be successfully accomplished (870), replication operating process 800 proceeds to making an indication of this failure (885), and concluding.

Figure 9:
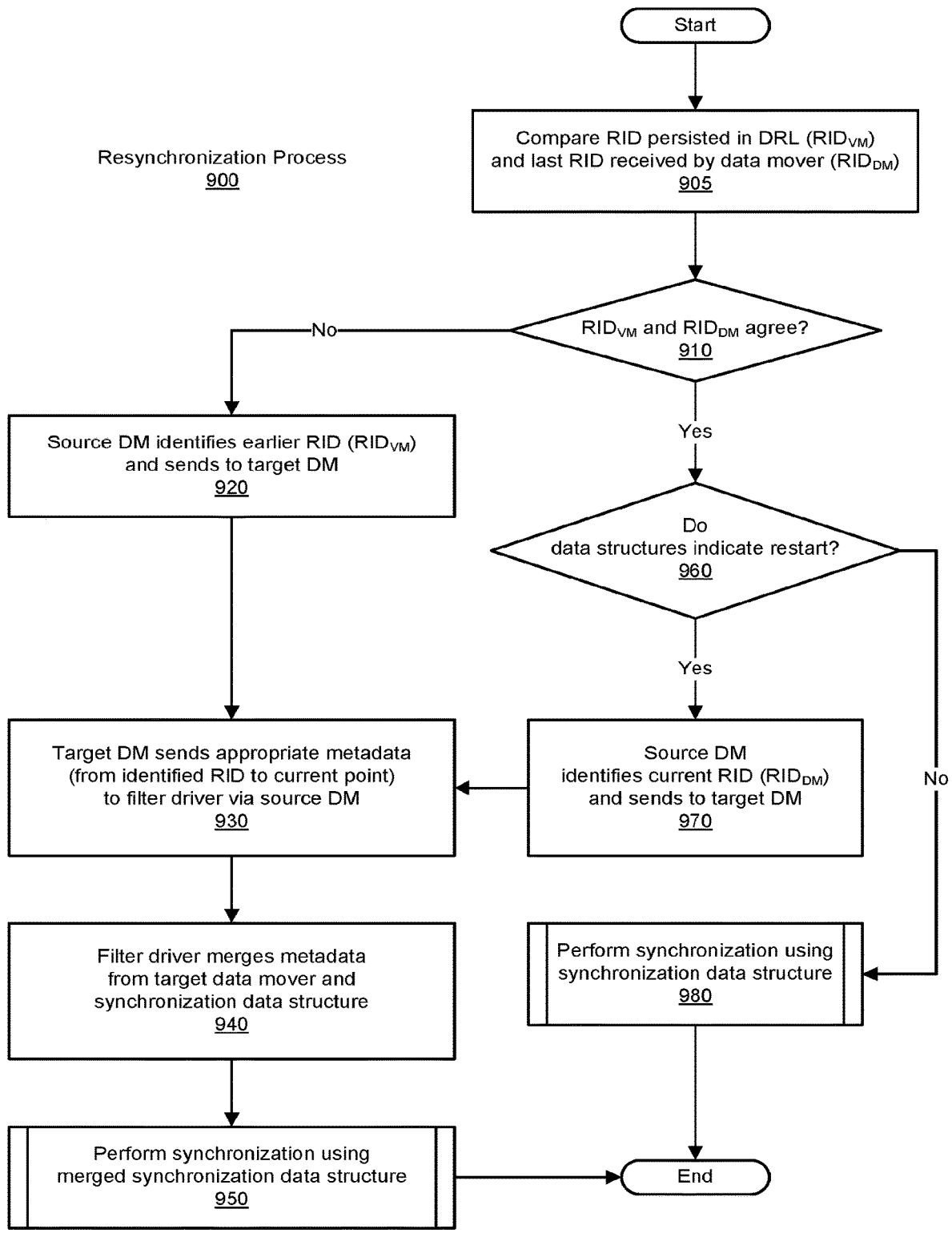
FIG. 9 is a flow diagram illustrating an example of a resynchronization process, according to one embodiment.

FIG. 9 is a flow diagram illustrating an example of a resynchronization process, according to one embodiment. FIG. 9 thus illustrates a resynchronization process 900, such as can be performed in certain embodiments such as those described herein in situations in which the replicated data in a target data store is or has become unsynchronized with respect to the source data in a source data store. Resynchronization process 900 begins with a comparison of a filter driver's restore identifier (as persisted in the source system's DRL storage unit) and the last restore identifier received by the source data mover in question (905). A determination is then made as to whether these restore identifier's agree with one another (910). As will be appreciated in light of the present disclosure, such agreement can depend on the type of information used in representing such restore identifiers, and thus, can also be described as the restore identifiers matching or being the same.

In the case in which the restore identifiers do not agree, the source data mover identifies the earlier restore identifier and sends that earlier restore identifier to the target data mover (920). In turn, the target data mover, having received this earlier restore identifier, retrieves metadata stored at the target system (e.g., in object storage), starting at the point in time indicated by the earlier restore identifier (the state of the target data store at the point at which the restore identifier was generated by the filter driver and received by the target data mover) to the current time (the target system's current state with regard to the target data store). The target data mover then sends this retrieved metadata to the filter driver (930).

The filter driver, at this juncture, has a synchronization data structure that reflects, for example, the state of the source data store and changes thereto resulting from write operations performed since the last restore identifier was generated. The filter driver receives the metadata sent by the target data mover, and merges this metadata with the now-existing synchronization data structure (940). In an embodiment in which such metadata and the synchronization data structure employing bitmaps, such a merge operation can be accomplished by performing an exclusive-OR (XOR) operation therebetween. In so doing, such an XOR operation results in a merged synchronization data structure that indicates changes to units of data (and so, the sending of units of data corresponding thereto) for cases in which such changes are reflected in the data stored in only one of the source data store or the target data store. Where the source data store and the target data store maintain the same data at a given location, the elements of such a merged synchronization data structure indicate that the source data need not be copied to the target data store (as a result of the data at that location in both the source data store and target data store being the same). Thus, the resulting synchronization data structure reflects only differences between the source data store and target data store, thereby limiting the source data transferred from the source data store to the target data store during such synchronization operations to source data needed to overwrite inconsistent data in the target data store.

In view of the foregoing, once the metadata from the target data mover has been merged with the synchronization data structure maintained by the filter driver, synchronization operations can be performed based on the information contained in the merged synchronization data structure (950). An example of such a synchronization process has been described in connection with FIG. 7, previously. Upon the completion of synchronization using the merged synchronization data structure, resynchronization process 900 concludes.

Alternatively, if a comparison of the restore identifiers indicates that the restore identifiers agree with one another, this indicates that the target data store is in a state representative of a point in time after the (matching) store identifier was generated. In this case, a determination is made as to whether the data structures maintained by the filter driver (e.g., its active data structure and/or synchronization data structure) indicate that a restart has occurred (960). If the data structures do not indicate that a restart event has occurred (e.g., as by containing no information indicating changed data (e.g., a cleared bitmap)), synchronization is performed in the normal course using the existing synchronization data structure (970). An example of such a synchronization process has been described in connection with FIG. 7, previously (in this case, employing the existing synchronization data structure). Alternatively, if the data structures indicate that a restart event has occurred, the source data mover identifies the current restore identifier as the point from which the target data mover should retrieve metadata, and sends this current restore identifier to the target data mover (980). As before, the target data mover retrieves the appropriate metadata and sends this metadata to the filter driver via the source data mover (930). Also as before, the filter driver merges this metadata with its synchronization data structure (940), and perform synchronization using this merged synchronization data structure (950). Upon completion of such synchronization, resynchronization process 900 concludes.

Operational Examples

Figure 10:
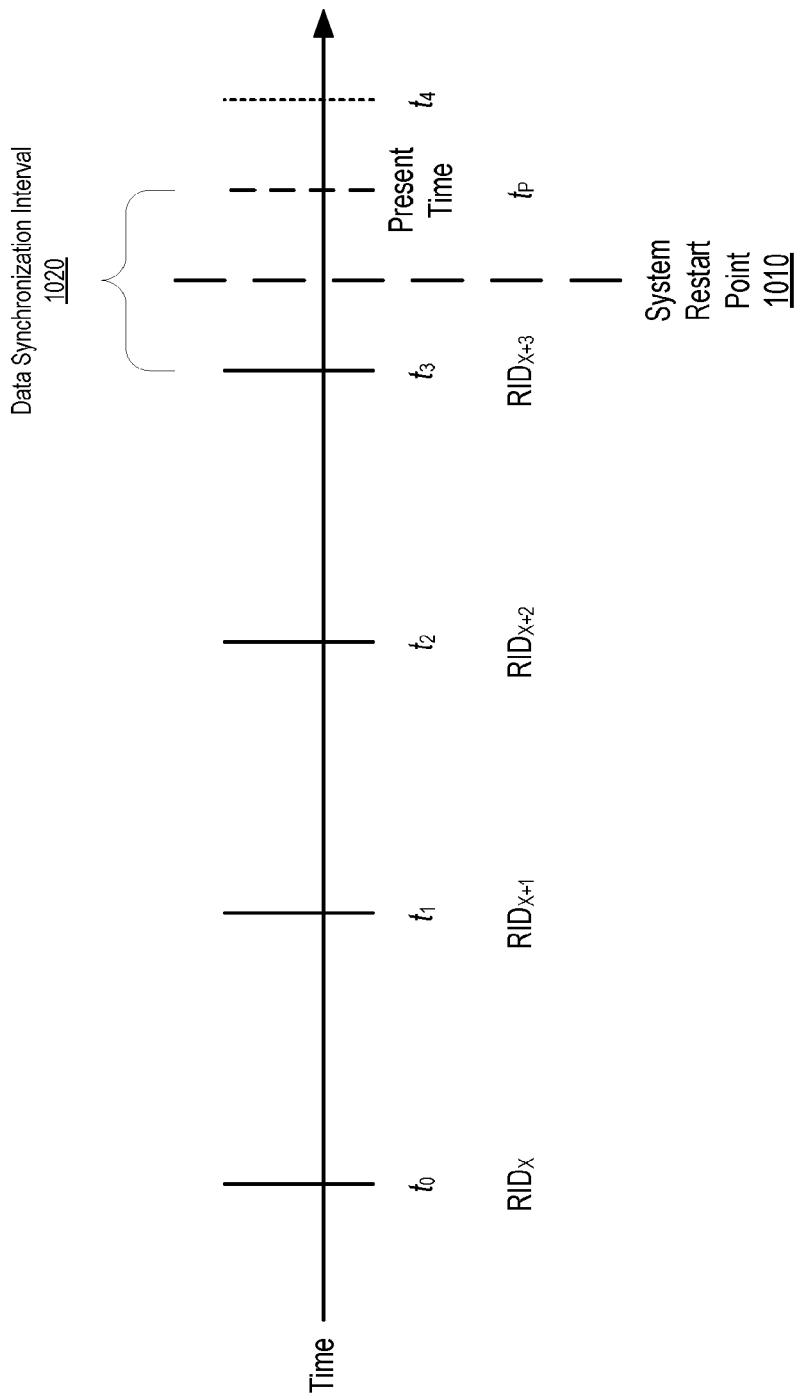
FIG. 10 is a diagram illustrating an example of a replication timeline, according to one embodiment.

FIG. 10 is a diagram illustrating an example of a replication timeline, according to one embodiment. FIG. 10 thus illustrates a replication timeline 1000. Replication timeline 1000 includes a number of points in time (to-t3, and, in the future, t4), at which points restore identifiers (RIDx-RIDx+3) have been generated and sent along with metadata to the target system. It is to be appreciated that, while replication timeline 1000 is described in terms of periods of time, amounts of data or other metrics can be used to comparable effect.

Also illustrated is a present time tp and, at an earlier point, a system restart point 1010. At system restart point 1010, the source data store in question "lags" the target data store to which its data has been replicated. In order to address such a situation, the filter driver performs handshake communications with the source data mover (also referred to as a replication gateway). In this situation, both the filter driver and the source data mover will have RIDx+3 as the current restore identifier. Further, the filter driver will be able to determine that, given that its data structures reflect the existence of changes to the source data store, that a restart event has occurred. That being the case, the filter driver, via the source data mover, sends the current restore identifier to the target data mover, which responds with metadata reflecting changes to the source data store of which it is aware (and has applied to the target data store). As will be appreciated, the metadata sent by the target data mover reflects the changes that of occurred between t3 and tp. (i.e., during a data synchronization interval 1020). As noted earlier herein, this metadata is merged with the synchronization data structure (as it will have existed at t3), thereby allowing the filter driver to synchronize target data in the target data store that is different from the source data in the source data store. As will also be appreciated, in retrieving this metadata, the target data mover can use the aforementioned data verification information to determine whether a given unit of data stored in the target data store has, in fact, ultimately remained unchanged (e.g., in the case in which the data in question has been changed, but has been changed back to its original state (and "X-Y-X")). In such a case, the target data mover can set or clear the corresponding element in the metadata, in order to prevent the filter driver from sending data that is the same as that already stored in the target data store.

Figure 11:
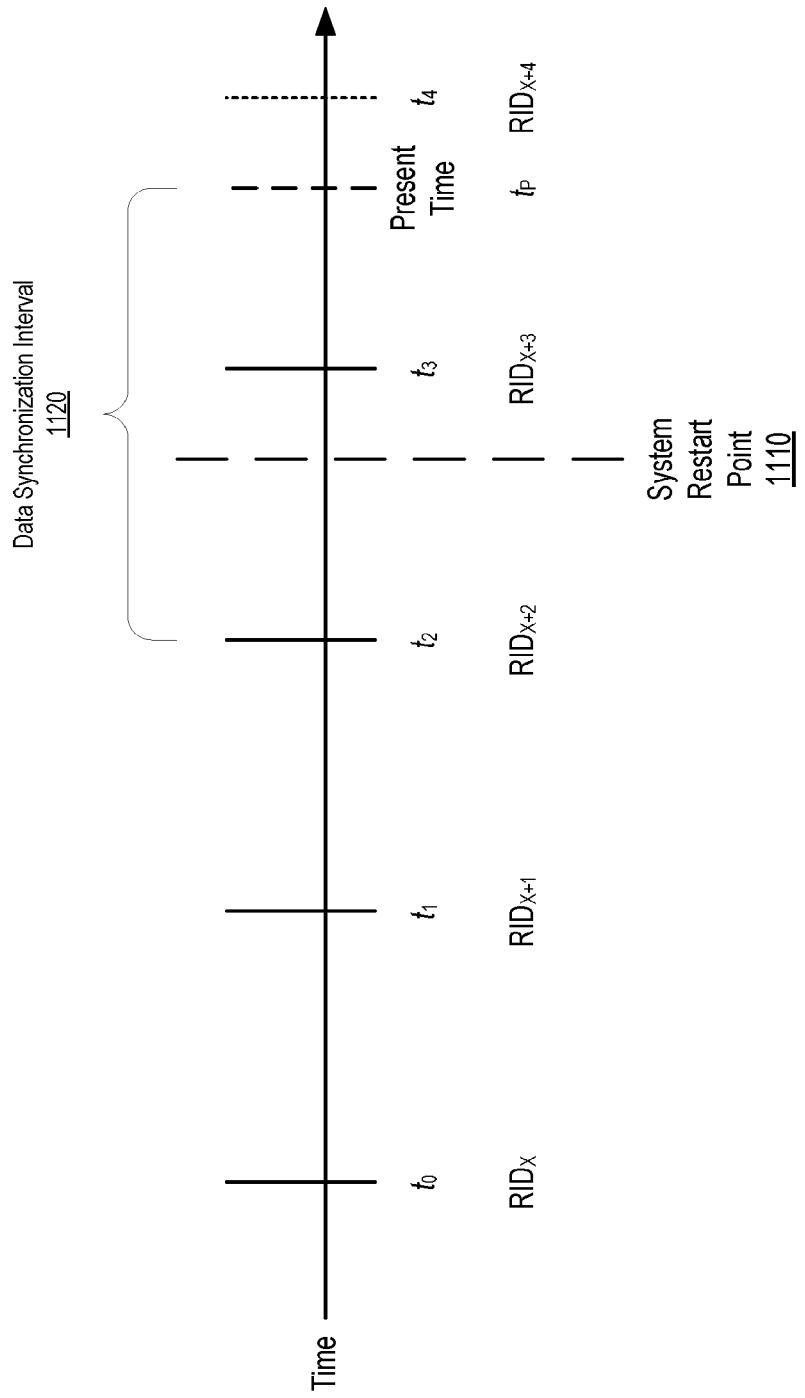
FIG. 11 is a diagram illustrating an example of another replication timeline, according to one embodiment.

FIG. 11 is a diagram illustrating an example of another replication timeline, according to one embodiment. FIG. 11 thus illustrates a replication timeline 1100. As before, with regard to replication timeline 1000, replication timeline 1100 includes a number of points in time (to-t3, and, in the future, t4), at which points restore identifiers (RIDx-RIDx+ 3) have been generated and sent along with metadata to the target system. It is to be appreciated that, while replication timeline 1100 is described in terms of periods of time, amounts of data or other metrics can be used to comparable effect.

Also illustrated is a present time tp and, at an earlier point, a system restart point 1110. At system restart point 1110, the source data store in question "lags" the target data store to which its data has been replicated, though by more than did system restart point 1010. In order to address such a situation, the filter driver performs handshake communications with the source data mover (also referred to as a replication gateway). In this situation, the filter driver and the source data mover have different restore identifiers as their respective current restore identifiers. Here, the filter driver will have RIDx+2 as its current restore identifier, while the source data mover will have RIDx+3 as its current restore identifier. At this juncture, handshake communications between the filter driver and the source data mover will reflect this discrepancy. That being the case, the source data mover will send the filter driver's current restore identifier (RIDx+2) to the target data mover as the current restore identifier. In turn, the target data mover will retrieve metadata from the point of the current restore identifier (RIDx+2) to the present time (tp).

In this scenario, the metadata sent by the target data mover reflects the changes that of occurred between t2 and tp (i.e., during a data synchronization interval 1120). As noted earlier herein, this metadata is merged with the synchronization data structure (as it will have existed at t2), thereby allowing the filter driver to synchronize target data in the target data store that is different from the source data in the source data store, and so return the data in the target data store to its state at the point in time of system restart 0.1110. As before, in retrieving this metadata, the target data mover can use the aforementioned data verification information to determine whether a given unit of data stored in the target data store has, in fact, ultimately remained unchanged (e.g., in the case in which the data in question has been changed, but has been changed back to its original state (and "X-Y-X")). In such a case, the target data mover can set or clear the corresponding element in the metadata, in order to prevent the filter driver from sending data that is the same as that already stored in the target data store.

It will be further appreciated that, in view of such examples, inefficiencies related to synchronizing the target data store with the current state of the source data store can be reduced by way of the more frequent generation of restore identifiers. Such inefficiencies are typically minimal, given that the frequency of generating restore identifiers is higher than the frequency associated with backup/snapshot windows (it being understood that, for purposes of the present disclosure, the operation resulting in a given machine's state returning to an earlier state is immaterial, and so results in no distinctions between backup operations, snapshot operations, and/or the like). Further still, unnecessary resynchronizations can be avoided by designing such filter drivers to perform increment-exchange-persist operations on restore identifiers as part of the normal shutdown process, thereby resulting in "clean" startups when, for example, rebooting machines.

Figure 12:
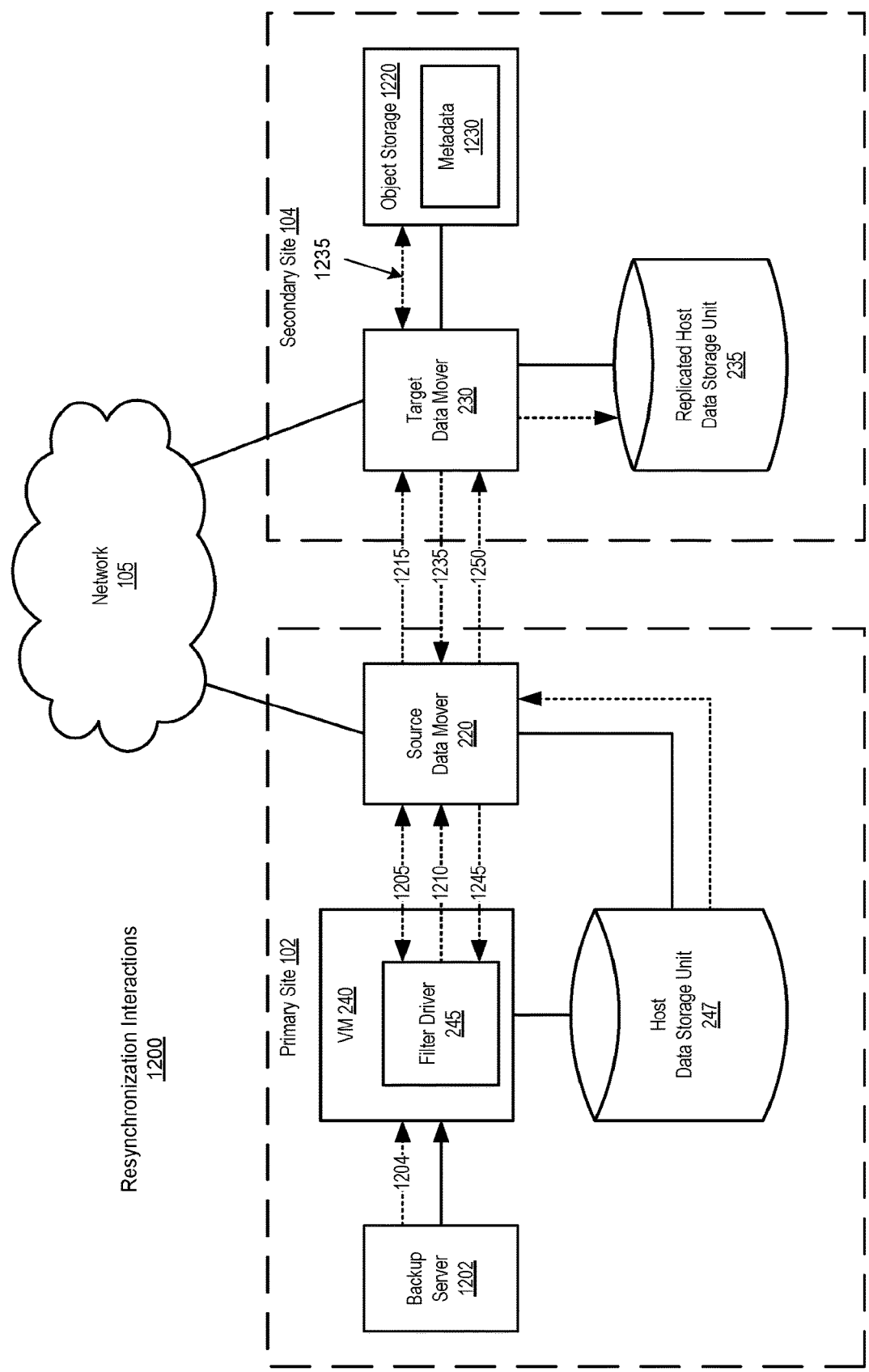
FIG. 12 is a block diagram illustrating an example of certain resynchronization interactions, according to one embodiment.

FIG. 12 is a block diagram illustrating an example of certain resynchronization interactions, according to one embodiment. FIG. 12 thus illustrates a number of resynchronization interactions (depicted in FIG. 12 as resynchronization interactions 1200), based, in large part, on elements depicted in FIGS. 1 and 2. In the manner described earlier herein, resynchronization interactions 1200 result from the restoration of virtual machine 240 from a backup server 1202 operated by an organization at primary site 102 (1204). The process of resynchronization begins with handshake communications between filter driver 245 and source data mover 220 (1205). As a result of such communications, filter driver 245 may send the last restore ID to source data mover 220 (1210), or source data mover 220 may already possess the proper restore ID. Source data mover 220 sends the appropriate restore ID to target data mover 230 (1215). In turn, target data mover 230 interacts with, for example, object storage 1220, retrieving metadata 1230 therefrom (1235). Target data mover 230 sends metadata 1230 to source data mover 220 (1235), which, in turn, sends metadata 1230 to filter driver 245 (1245). Filter driver 245 then merges metadata 1230 with it synchronization data structure, in order to identify units of data needing to be sent from the source data store in host data storage unit 247, to be saved in replicated host data storage unit 235 (overwriting inconsistent data stored therein). Once synchronization operations have commenced, filter driver 245 uses the resulting merged synchronization data structure to move copies of data from host data storage unit 247, through source data mover 220 and target data mover 230, to replicated host data storage unit 235, thereby synchronizing the target data store with the source data store (by overwriting the now-inconsistent target data stored in the target data store) (1250). As noted, the active data structure maintained by filter driver 245 captures right operations while this synchronization operation is ongoing. Once the synchronization operations have concluded, the source data stored in the source data store and the target data stored in the target data store are synchronized, and changes reflected in the active data structure can be used by the now-ongoing replication operations.

An Example Computing and Network Environment

As noted, the systems described herein can be implemented using a variety of computer systems and networks. The following illustrates an example configuration of a computing device such as those described herein. The computing device may include one or more processors, a random access memory (RAM), communication interfaces, a display device, other input/output (I/O) devices (e.g., keyboard, trackball, and the like), and one or more mass storage devices (e.g., optical drive (e.g., CD, DVD, or Blu-ray), disk drive, solid state disk drive, non-volatile memory express (NVME) drive, or the like), configured to communicate with each other, such as via one or more system buses or other suitable connections. While a single system bus 514 is illustrated for ease of understanding, it should be understood that the system buses 514 may include multiple buses, such as a memory device bus, a storage device bus (e.g., serial ATA (SATA) and the like), data buses (e.g., universal serial bus (USB) and the like), video signal buses (e.g., Thunder-Bolt®, DVI, HDMI, and the like), power buses, or the like.

Such CPUs are hardware devices that may include a single processing unit or a number of processing units, all of which may include single or multiple computing units or multiple cores. Such a CPU may include a graphics processing unit (GPU) that is integrated into the CPU or the GPU may be a separate processor device. The CPU may be implemented as one or more microprocessors, microcomputers, microcontrollers, digital signal processors, central processing units, graphics processing units, state machines, logic circuitries, and/or any devices that manipulate signals based on operational instructions. Among other capabilities, the CPU may be configured to fetch and execute computer-readable instructions stored in a memory, mass storage device, or other computer-readable storage media.

Memory and mass storage devices are examples of computer storage media (e.g., memory storage devices) for storing instructions that can be executed by the processors to perform the various functions described herein. For example, memory can include both volatile memory and non-volatile memory (e.g., RAM, ROM, or the like) devices. Further, mass storage devices may include hard disk drives, solid-state drives, removable media, including external and removable drives, memory cards, flash memory, floppy disks, optical disks (e.g., CD, DVD, Blu-ray), a storage array, a network attached storage, a storage area network, or the like. Both memory and mass storage devices may be collectively referred to as memory or computer storage media herein and may be any type of non-transitory media capable of storing computer-readable, processor-executable program instructions as computer program code that can be executed by the processors as a particular machine configured for carrying out the operations and functions described in the implementations herein.

The computing device may include one or more communication interfaces for exchanging data via a network. The communication interfaces can facilitate communications within a wide variety of networks and protocol types, including wired networks (e.g., Ethernet, DOCSIS, DSL, Fiber, USB, etc.) and wireless networks (e.g., WLAN, GSM, CDMA, 802.11, Bluetooth, Wireless USB, ZigBee, cellular, satellite, etc.), the Internet and the like. Communication interfaces can also provide communication with external storage, such as a storage array, network attached storage, storage area network, cloud storage, or the like.

The display device may be used for displaying content (e.g., information and images) to users. Other I/O devices may be devices that receive various inputs from a user and provide various outputs to the user, and may include a keyboard, a touchpad, a mouse, a printer, audio input/output devices, and so forth. The computer storage media, such as memory 504 and mass storage devices, may be used to store software and data, such as, for example, an operating system, one or more drivers (e.g., including a video driver for a display such as display 180), one or more applications, and data. Examples of such computing and network environments are described below with reference to FIGS. 13 and 14.

Figure 13:
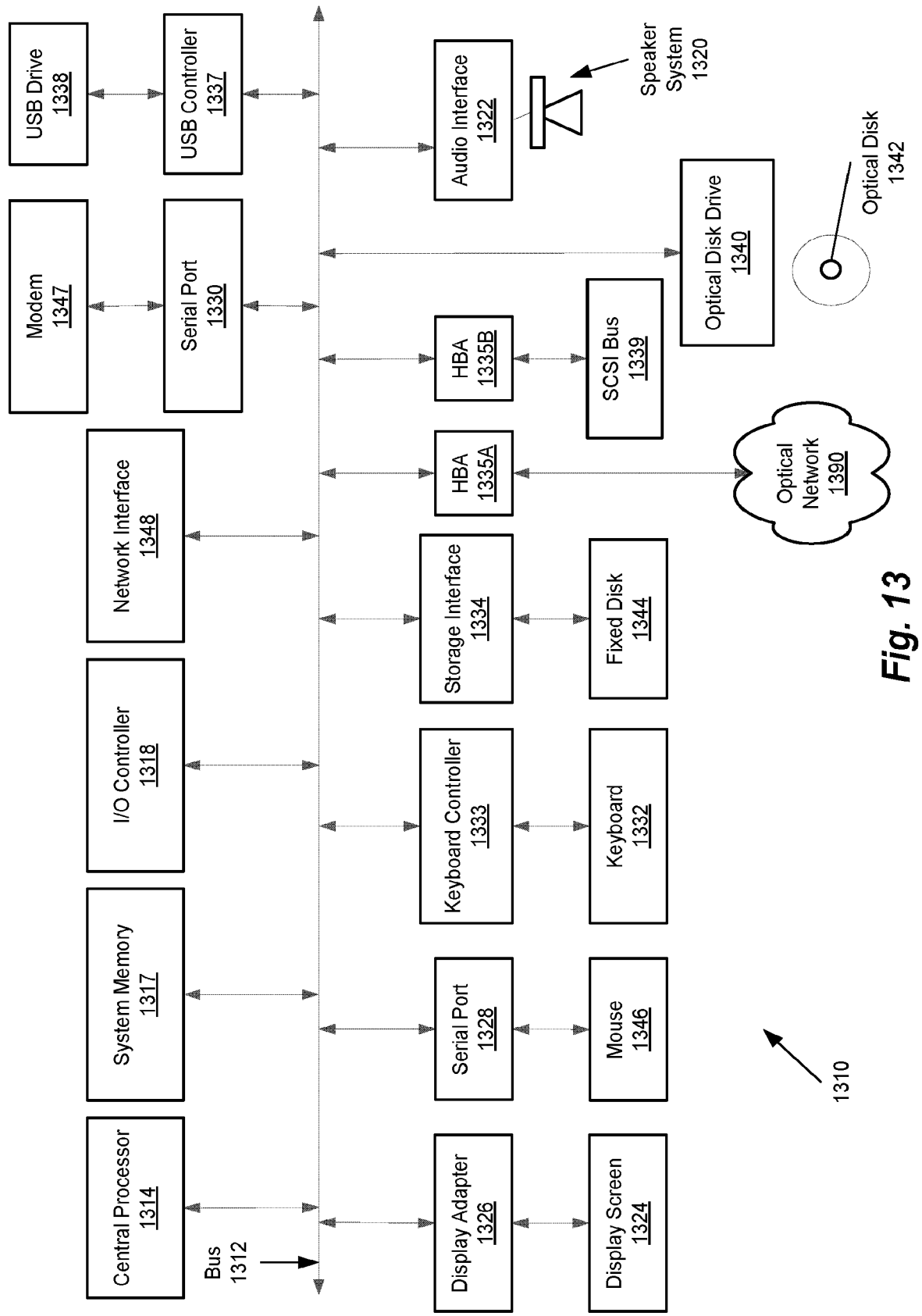
FIG. 13 is a simplified block diagram illustrating components of an example computer system suitable for implementing embodiments of the present disclosure, according to one embodiment.

FIG. 13 depicts a block diagram of a computer system 1310 suitable for implementing aspects of the systems described herein. Computer system 1310 includes a bus 1312 which interconnects major subsystems of computer system 1310, such as a central processor 1314, a system memory 1317 (typically RAM, but which may also include ROM, flash RAM, or the like), an input/output controller 1318, an external audio device, such as a speaker system 1320 via an audio output interface 1322, an external device, such as a display screen 1324 via display adapter 1326, serial ports 1328 and 1330, a keyboard 1332 (interfaced with a keyboard controller 1333), a storage interface 1334, a USB controller 1337 operative to receive a USB drive 1338, a host bus adapter (HBA) interface card 1335A operative to connect with a optical network 1390, a host bus adapter (HBA) interface card 1335B operative to connect to a SCSI bus 1339, and an optical disk drive 1340 operative to receive an optical disk 1342. Also included are a mouse 1346 (or other point-and-click device, coupled to bus 1312 via serial port 1328), a modem 1347 (coupled to bus 1312 via serial port 1330), and a network interface 1348 (coupled directly to bus 1312).

Bus 1312 allows data communication between central processor 1314 and system memory 1317, which may include read-only memory (ROM) or flash memory (neither shown), and random access memory (RAM) (not shown), as previously noted. RAM is generally the main memory into which the operating system and application programs are loaded. The ROM or flash memory can contain, among other code, the Basic Input-Output System (BIOS) which controls basic hardware operation such as the interaction with peripheral components. Applications resident with computer system 1310 are generally stored on and accessed from a computer-readable storage medium, such as a hard disk drive (e.g., fixed disk 1344), an optical drive (e.g., optical drive 1340), a universal serial bus (USB) controller 1337, or other computer-readable storage medium.

Storage interface 1334, as with the other storage interfaces of computer system 1310, can connect to a standard computer-readable medium for storage and/or retrieval of information, such as a fixed disk drive 1344. Fixed disk drive 1344 may be a part of computer system 1310 or may be separate and accessed through other interface systems. Modem 1347 may provide a direct connection to a remote server via a telephone link or to the Internet via an internet service provider (ISP). Network interface 1348 may provide a direct connection to a remote server via a direct network link to the Internet via a POP (point of presence). Network interface 1348 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 13 need not be present to practice the systems described herein. The devices and subsystems can be interconnected in different ways from that shown in FIG. 13. The operation of a computer system such as that shown in FIG. 13 will be readily understood in light of the present disclosure. Code to implement portions of the systems described herein can be stored in computer-readable storage media such as one or more of system memory 1317, fixed disk 1344, optical disk 1342, or USB drive 1338. The operating system provided on computer system 1310 may be WINDOWS, UNIX, LINUX, IOS, or other operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 14:
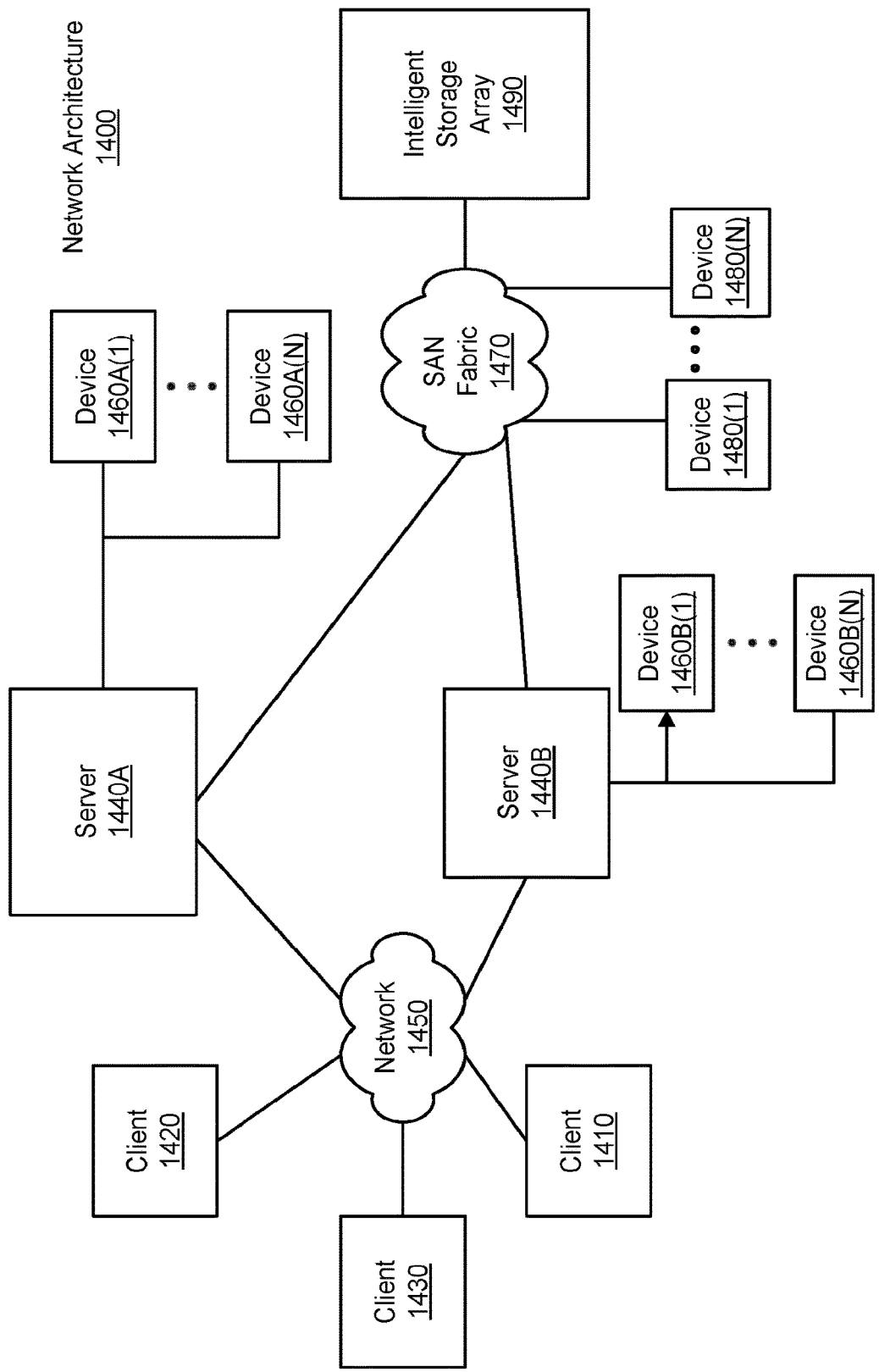
FIG. 14 is a simplified block diagram illustrating components of an example computer system suitable for implementing embodiments of the present disclosure, according to one embodiment.

FIG. 14 is a block diagram depicting a network architecture 1400 in which client systems 1410, 1420 and 1430, as well as storage servers 1440A and 1440B (any of which can be implemented using computer system 1410), are coupled to a network 1450. Storage server 1440A is further depicted as having storage devices 1460A(1)-(N) directly attached, and storage server 1440B is depicted with storage devices 1460B(1)-(N) directly attached. Storage servers 1440A and 1440B are also connected to a SAN fabric 1470, although connection to a storage area network is not required for operation. SAN fabric 1470 supports access to storage devices 1480(1)-(N) by storage servers 1440A and 1440B, and so by client systems 1410, 1420, and 1430 via network 1450. An intelligent storage array 1490 is also shown as an example of a specific storage device accessible via SAN fabric 1470.

With reference to computer system 1310, modem 1347, network interface 1348, or some other method can be used to provide connectivity from each of client computer systems 1410, 1420 and 1430 to network 1450. Client systems 1410, 1420, and 1430 are able to access information on storage server 1440A or 1440B using, for example, a web browser or other client software (not shown). Such a client allows client systems 1410, 1420 and 1430 to access data hosted by storage server 1440A or 1440B, or one of storage devices 1460A(1)-(N), 1460B(1)-(N), 1480(1)-(N) or intelligent storage array 1490. FIG. 14 depicts the use of a network such as the Internet for exchanging data, but the systems described herein are not limited to the Internet or any particular network-based environment.

Other Embodiments

The example systems and computing devices described herein are well adapted to attain the advantages mentioned as well as others inherent therein. While such systems have been depicted, described, and are defined by reference to particular descriptions, such references do not imply a limitation on the claims, and no such limitation is to be inferred. The systems described herein are capable of considerable modification, alteration, and equivalents in form and function, as will occur to those ordinarily skilled in the pertinent arts in considering the present disclosure. The depicted and described embodiments are examples only, and are in no way exhaustive of the scope of the claims.

Such example systems and computing devices are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

The foregoing thus describes embodiments including components contained within other components (e.g., the various elements shown as components of computer system 1310). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation. As such, the various embodiments of the systems described herein via the use of block diagrams, flowcharts, and examples. It will be understood by those within the art that each block diagram component, flowchart step, operation and/or component illustrated by the use of examples can be implemented (individually and/or collectively) by a wide range of hardware, software, firmware, or any combination thereof.

The systems described herein have been described in the context of fully functional computer systems; however, those skilled in the art will appreciate that the systems described herein are capable of being distributed as a program product in a variety of forms, and that the systems described herein apply equally regardless of the particular type of computer-readable media used to actually carry out the distribution. Examples of computer-readable media include computer-readable storage media, as well as media storage and distribution systems developed in the future.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

In light of the foregoing, it will be appreciated that the foregoing descriptions are intended to be illustrative and should not be taken to be limiting. As will be appreciated in light of the present disclosure, other embodiments are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the claims. Variations and modifications of the embodiments disclosed herein can be made based on the description set forth herein, without departing from the scope of the claims, giving full cognizance to equivalents thereto in all respects.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   generating an update set, wherein
      the update set is generated by a source data mover at a source site,
      the update set comprises one or more replication updates, and
      the update set comprises data of the one or more replication updates and associated metadata of the one or more replication updates;
   generating a restore identifier at the source site, wherein
      the restore identifier facilitates resynchronization of data stored at the source site with data stored at a target site, in event of a restoration operation, by facilitating identification of that portion of the data stored at the target site that has changed since a beginning of a data synchronization interval associated with the restore identifier, using a data structure for synchronization;
   sending the update set and the restore identifier to a target data mover at the target site, wherein
      the sending is performed by the source data mover; and
   storing the restore identifier.

2. The method of claim 1, wherein the storing comprises:
   storing the update set at the target site; and
   persisting the restore identifier at the target site, wherein
      the restore identifier is stored at the source site as a current restore identifier.

3. The method of claim 2, wherein
   the storing the restore identifier is performed in response to receipt, by the source data mover, of an indication that the update set was successfully received by the target data mover.

4. The method of claim 2, wherein the storing comprises:
   writing the restore identifier to a dirty region log at the source site, wherein
      the writing overwrites a previous restore identifier with the restore identifier, and
      the previous restore identifier was the current restore identifier prior to the writing.

5. The method of claim 1, further comprising:
   storing the update set at the target site;
   persisting the restore identifier at the target site, wherein
      the restore identifier is stored at the source site;
   comparing the restore identifier and a current restore identifier, wherein
      the restore identifier and the current restore identifier are ones of a plurality of restore identifiers, and
      the current restore identifier was stored prior to the generating the restore identifier; and
   in response to the comparing indicating that the current restore identifier is subsequent to the restore identifier, causing the source data mover to indicate performance of the restore operation at the source site, to the target data mover.

6. The method of claim 5, wherein
   further in response to the comparing indicating that the restore identifier is equal or subsequent to the current restore identifier, preventing performance of the sending and the persisting.

7. The method of claim 5, wherein
   in response to the comparing indicating that the restore identifier is subsequent to the current restore identifier, performing the sending and the persisting.

8. The method of claim 5, wherein
   the restore operation is at least one of
      a restore operation from a backup operation performed at the source site, or
      a restore operation from a snapshot operation performed at the source site.

9. The method of claim 5, further comprising:
   during the restoration operation, preventing performance of at least one or a migration operation or a takeover operation.

10. The method of claim 1, wherein
    the restore identifier is one of a plurality of restore identifiers that are generated, and
    a new restore identifier of the plurality of restore identifiers is generated with a periodicity that is based, at least in part, on at least one of
       an amount of data replicated,
       an active replication load, and/or
       a time interval.

11. The method of claim 1, wherein
the associated metadata comprises the restore identifier, and
the restore identifier is sent as part of the update set.

12. The method of claim 1, wherein
the associated metadata further comprises:
  logical block number information,
  size information, and
  physical block number information.

13. The method of claim 1, wherein
the restore identifier is at least one of
  a version,
  a counter, or
  a universally-unique identifier.

14. The method of claim 1, further comprising:
maintaining an active bitmap and a synchronization bitmap, wherein
  source data is maintained at the source site,
  replicated data is maintained at the target site, and
  the active bitmap and the synchronization bitmap are maintained such that at least one of the following is performed
    in a running state, the active bitmap is updated and the synchronization bitmap is empty,
    in a disconnected state, the active bitmap is updated and the synchronization bitmap is empty, or
    during a re-connection operation,
      the active bitmap is emptied by merging the active bitmap into the synchronization bitmap, and
      the synchronization bitmap is cleared by resynchronizing the source data and the replicated data.

15. A method comprising:
receiving an update set and a restore identifier from a source data mover, wherein
  the update set and the restore identifier are received by a target data mover at a target site,
  the update set was generated from source data at a source site by the source data mover,
  a replicated copy of the source data is maintained at the target site as replicated data,
  the update set comprises one or more replication updates, and
  the update set comprises data of the one or more replication updates and associated metadata of the one or more replication updates;
comparing the restore identifier to a persisted restore identifier;
in response to the comparing indicating that the restore identifier is subsequent to the persisted restore identifier,
  persisting the restore identifier at the target site, and
  applying the update set to the replicated data; and
in response to the comparing indicating that the persisted restore identifier is subsequent to the restore identifier, awaiting receipt of a synchronization bitmap.

16. The method of claim 15, further comprising:
receiving the synchronization bitmap, wherein
  the synchronization bitmap comprises a plurality of bits;
receiving a plurality of checksums, wherein
  each checksum of the plurality of checksums is a checksum of a unit of source data represented by a bit of the plurality of bits; and
for each bit of the plurality of bits,
  comparing a corresponding checksum of the plurality of checksums corresponding to the each bit and a checksum of a unit of target data corresponding to the unit of source data represented by the each bit, and
  in response to the corresponding checksum and the checksum of the unit of target data corresponding to the unit of source data represented by the each bit not matching, sending the unit of target data to the source data mover.

17. The method of claim 15, further comprising:
in response to the corresponding checksum and the checksum matching, skipping the unit of target data.

18. The method of claim 15, wherein
the associated metadata further comprises:
  logical block number information,
  size information, and
  physical block number information.

19. The method of claim 15, wherein
the restore identifier is at least one of
  a version,
  a counter, or
  a universally-unique identifier.

20. The method of claim 15, wherein
the associated metadata comprises the restore identifier, and
restore identifier is sent as part of the update set.

21. A non-transitory computer-readable storage medium, comprising program instructions, which, when executed by one or more processors of a computing system, perform a method comprising:
generating an update set, wherein
  the update set is generated by a source data mover at a source site,
  the update set comprises one or more replication updates, and
  the update set comprises data of the one or more replication updates and associated metadata of the one or more replication updates;
generating a restore identifier at the source site, wherein
  the restore identifier facilitates resynchronization of data stored at the source site with data stored at a target site, in event of a restoration operation, by facilitating identification of that portion of the data stored at the target site that has changed since a beginning of a data synchronization interval associated with the restore identifier, using a data structure for synchronization;
sending the update set and the restore identifier to a target data mover at the target site, wherein
  the sending is performed by the source data mover; and
storing the restore identifier.

* * * * *